United States Patent
Havens et al.

(10) Patent No.: US 6,547,139 B1
(45) Date of Patent: Apr. 15, 2003

(54) METHOD AND APPARATUS FOR EXTENDING OPERATING RANGE OF BAR CODE SCANNER

(75) Inventors: William H. Havens, Marcellus, NY (US); Charles M. Hammond, Skaneateles, NY (US)

(73) Assignee: Welch Allyn Data Collection, Inc., Skaneateles Falls, NY (US)

( * ) Notice: Subject to any disclaimer, the term of this patent is extended or adjusted under 35 U.S.C. 154(b) by 293 days.

(21) Appl. No.: 09/594,870

(22) Filed: Jun. 15, 2000

Related U.S. Application Data

(63) Continuation-in-part of application No. 09/113,523, filed on Jul. 10, 1998, now Pat. No. 6,097,856.

(51) Int. Cl.[7] ................................................. G06K 7/10

(52) U.S. Cl. ..................... 235/454; 235/459; 235/461; 235/462.22; 235/462.21; 235/462.26; 235/462.32

(58) Field of Search ................................. 235/454, 459, 235/461, 462.22, 462.21, 462.26, 462.37

(56) References Cited

U.S. PATENT DOCUMENTS

| 4,275,454 | A | * | 6/1981 | Klooster, Jr. .................. 359/29 |
| 5,142,412 | A | * | 8/1992 | Deschamps et al. ........ 324/166 |
| 6,097,856 | A | * | 8/2000 | Hammond, Jr. ............. 382/312 |
| 6,213,397 | B1 | * | 4/2001 | Rando ........................ 235/454 |
| 6,260,763 | B1 | * | 7/2001 | Svetal ........................ 235/454 |
| 6,297,293 | B1 | * | 7/2001 | Dwinell et al. ............. 138/109 |

FOREIGN PATENT DOCUMENTS

JP 409295442 A * 11/1997

* cited by examiner

Primary Examiner—Karl D. Frech
Assistant Examiner—Allyson Sanders
(74) Attorney, Agent, or Firm—Wall Marjama & Bilinski LLP

(57) ABSTRACT

The operating depth of field for a bar code scanner, preferably a laser scanner, is increased by placing a cubic phase mask (CPM) in the scanning beam. The masked beam is then scanned and reflected off a bar code and received by a photodetector. The received signal is then processed to recover the original unperturbed representation of the bar code pattern. The processed signal has an increased depth of field over an unmasked scanner signal.

34 Claims, 26 Drawing Sheets

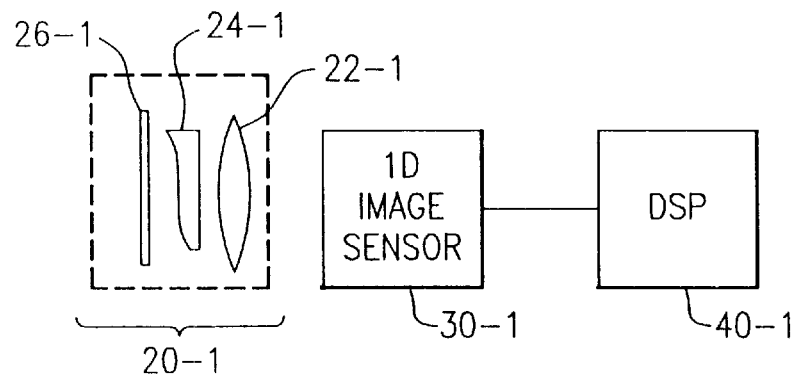
FIG.3A
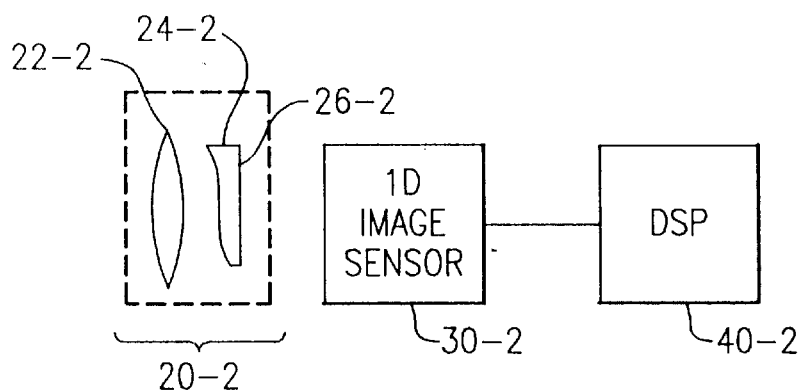
FIG.3B
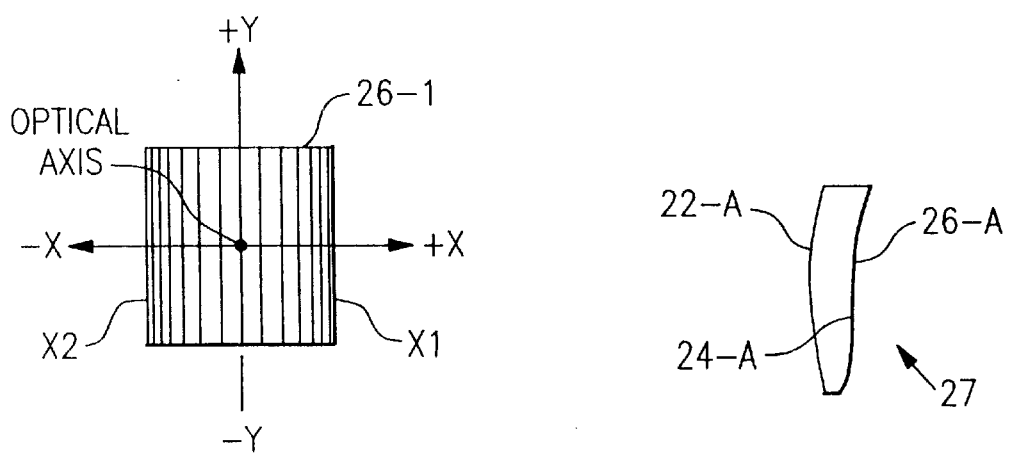
FIG.3C
FIG.3D (1) $\text{PUPIL}(u) = \text{GAUSS}(u, W_g) \cdot \text{CPM}(u, \alpha) \cdot \text{ABERRATIONS}(u)$ (2) $\text{OTF}(u) = \displaystyle\int_{-\left(1-\frac{|u|}{2}\right)}^{\left(1-\frac{|u|}{2}\right)} \text{PUPIL}\left(x+\frac{u}{2}\right) \overline{\text{PUPIL}\left(x-\frac{u}{2}\right)} \, dx$ (3) $\text{FILTER}(u) = \dfrac{\text{ZEROS}(u)}{\text{POLES}(u)}$ (4) $\text{GAUSS}(u, W_g) = \begin{cases} \exp\left[-\left(\dfrac{u}{W_g}\right)^2\right] & \text{if } |u| \leq 1 \\ 0 & \text{otherwise} \end{cases}$ (5) $\text{CPM}(u, \alpha) = \begin{cases} \exp\left[i \cdot \alpha \cdot (u)^3\right] & \text{if } |u| \leq 1 \\ 0 & \text{otherwise} \end{cases}$ (6) $\text{ABERRATIONS}(u) = \exp(i \cdot k \cdot \text{OPD}(0, u, 0))$ (7) $\text{OPD}(h, \rho, \phi) = \displaystyle\sum_{abc=000}^{ABC} C_{abc} \cdot h^a \cdot \rho^b \cdot \cos(\phi)^c$ (8) $\alpha = k \cdot (n-1) \cdot C03 \left(\dfrac{L}{2}\right)^3$

WHERE:

u  IS THE NORMALIZED 1D SPATIAL FREQUENCY, i.e. DIVIDED BY THE COHERENT CUTOFF FREQUENCY OF THE OPTICAL SYSTEM $W_g$  IS THE GAUSSIAN AMPLITUDE FUNCTION PARAMETER $\alpha$  IS THE CUBIC PHASE FUNCTION PARAMETER $k = \dfrac{2 \cdot \pi}{\lambda}$  IS THE ILLUMINATION WAVENUMBER $\lambda$  IS THE ILLUMINATION WAVELENGTH n  IS THE REFRACTIVE INDEX OF THE PHASE MASK MATERIAL

C03  IS THE CUBIC PHASE COEFFICIENT

L  IS THE WIDTH OF THE SQUARE APERTURE

FIG.10

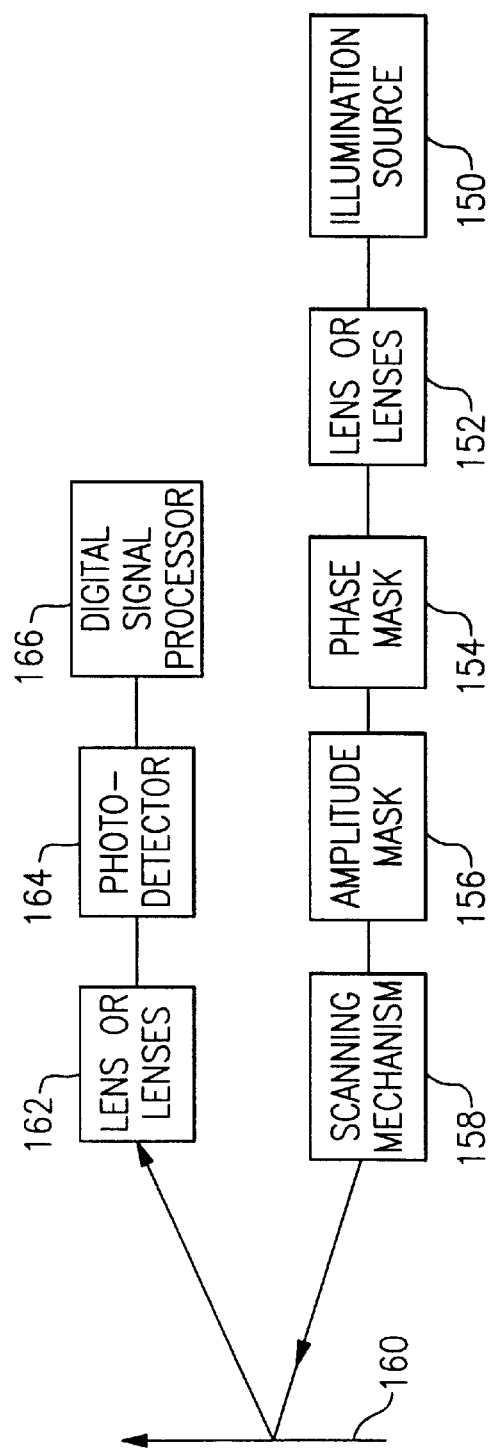
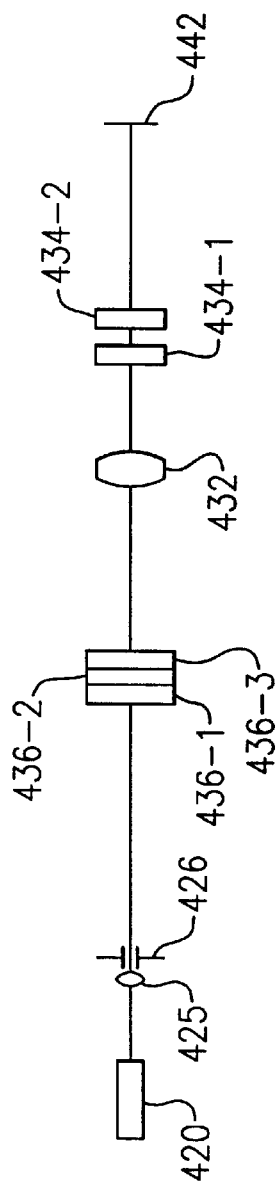

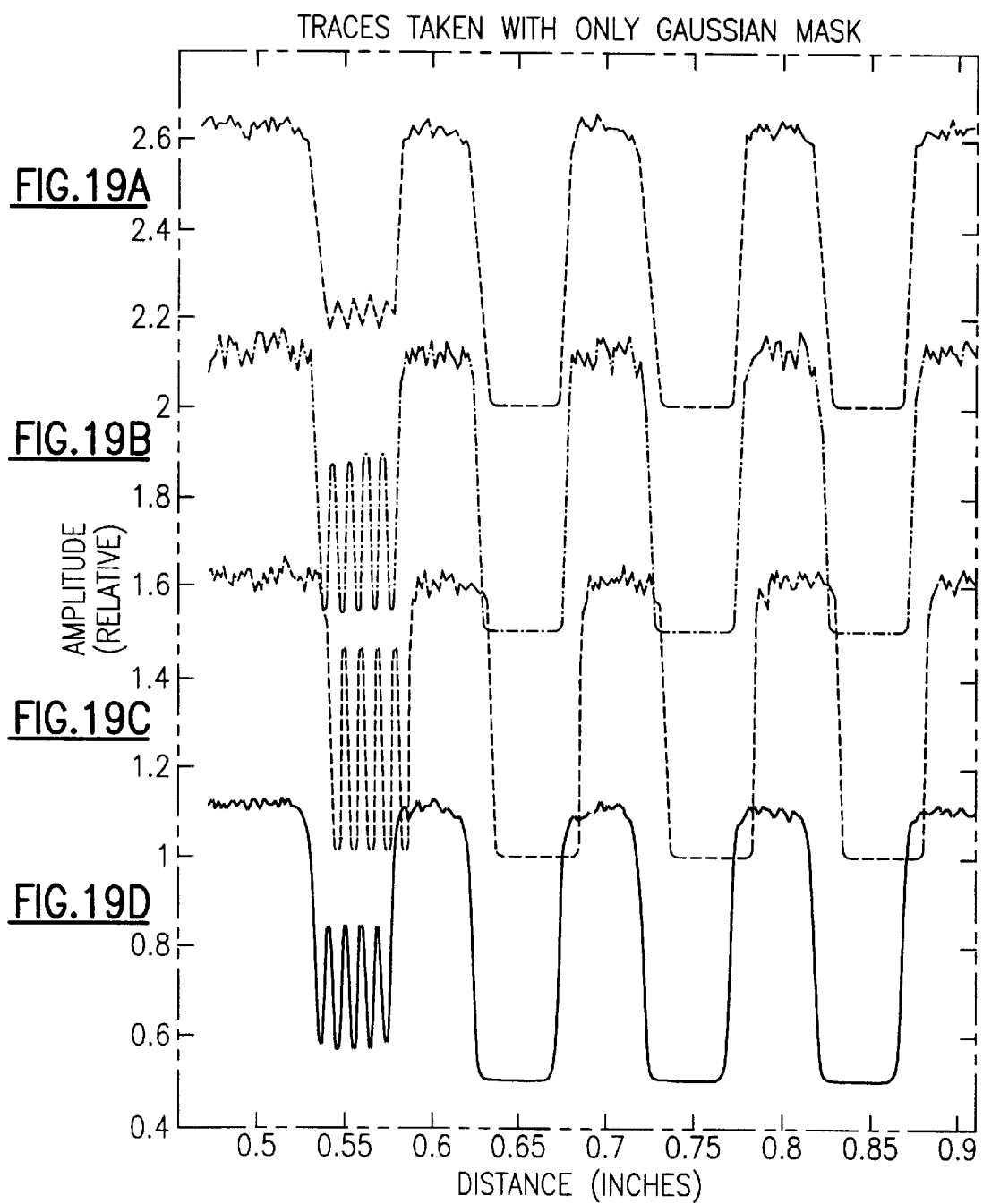

METHOD AND APPARATUS FOR EXTENDING OPERATING RANGE OF BAR CODE SCANNER

CROSS-REFERENCE TO RELATED APPLICATIONS

This application is a continuation in part of U.S. application Ser. No. 09/113,523 filed Jul. 10, 1998 now U.S. Pat. No. 6,097,856 and entitled APPARATUS AND METHOD FOR REDUCING IMAGING ERRORS IN IMAGING SYSTEMS HAVING AN EXTENDED DEPTH OF FIELD, incorporated herein by reference.

FIELD OF THE INVENTION

This invention pertains to the field of bar code scanners, and in particular to extending the depth of field for a laser bar code scanner.

BACKGROUND OF THE INVENTION

Many industries, including the assembly processing, grocery and food processing industries, utilize an identification system in which the products are marked with a bar code symbol consisting of a series of lines and spaces of varying widths, or other types of symbols consisting of series of contrasting markings. A number of different bar code readers and laser scanning systems have been developed to decode the symbol pattern to a multiple digit representation for inventory, production tracking, and for check out or sales purposes. Optical scanners are available in a variety of configurations, some of which are built into a fixed scanning station and others of which are portable. The portability of an optical scanner provides a number of advantages, including the ability to inventory products on shelves and to track portable items such as files, documents, or small equipment. A number of portable scanners (usually moving beam) use lasers which permit the user to scan the bar code symbols at variable distances from the surface on which the bar code is imprinted. However, the possible distances are limited by the depth of field (DOF).

Various optical readers and optical scanning systems have been developed for reading bar code symbols appearing on a label or on the surface of an article. The bar code symbol itself is a coded pattern of indicia composed of a series of bars of various widths spaced apart from one another to form boundary spaces of various widths, with the bars and spaces having different light reflecting characteristics. The readers and scanning systems transform the graphic indicia information patterns into electrical signals, which are decoded into alphanumerical characters with information content. Such characters are typically represented in digital form and used as input to a data processing system for applications in point-of-sale processing, inventory control, etc.

Bar code symbols are formed from bars or elements that are typically rectangular in shape with a variety of possible widths. The specific arrangement of elements defines the character represented according to a set of rules and definitions specified by the symbology used. The relative width of the bars and spaces is determined by the type of symbology used, and the actual size of the bars and spaces is usually determined by the application. The number of characters per inch represented by the bar code symbol is referred to as the density of the symbol. To encode a desired sequence of characters, groups of elements are concatenated together to form the complete bar code symbol, with each character of the message being represented by its own corresponding group of elements. In some symbologies a unique "start" and "stop" character is used to indicate where the bar code pattern begins and ends. A number of different bar code symbologies exist. These symbologies include, e.g., PD417, UPC/EAN, Code 39, Code 49, Code 128, Codabar, and Interleaved 2 of 5, etc.

One embodiment of such a scanning system resides in a hand-held, portable laser scanning head supported by a user which is configured to allow the user to aim the light beam at a symbol to be read. The light source in a laser scanner is typically a gas laser or semiconductor laser. The use of semiconductor devices such as a laser diode as the light source in scanning systems is especially desirable because of their small size, low cost and low power requirements. The laser beam is optically modified, typically by a condenser lens, to form a waist-shaped beam in which the width of the beam diminishes with distance until reaching a minimum, or waist, and then increases. The beam is focused so that a desired spot size is achieved at the target (bar code) distance, typically so that the waist is located at the target distance.

The spot size at the target distance should be approximately the same as the minimum width between regions of different light reflectivity, i.e., the width of the bars and spaces of the symbol.

In the scanning systems known in the art, the light beam is directed by a lens or similar optical components along a light path toward a target that includes a bar code symbol on the surface. The scanner functions by repetitively scanning the light beam in a line or series of lines across the symbol. The scanning component may either sweep the beam spot across the symbol and trace a scan line across and past the symbol, or scan the field of view of the scanner, or do both. Scanning systems also include a sensor or photodetector which functions to detect light reflected from the symbol. The photo-detector is positioned in the scanner or in an optical path in which it has a field of view which extends across and slightly past the symbol. A portion of the reflected light which is reflected off the symbol is detected and converted into an electrical signal. Electronic circuitry or software decodes the electrical signal into a digital representation of the data represented by the symbol that has been scanned. For example, the analog electrical signal from the photodetector may be converted into a pulse width modulated digital signal, with the time intervals proportional to the physical widths of the bars and spaces. Such a signal is then decoded according to the specific symbology into a binary representation of the data encoded in the symbol.

Bar code symbols are printed in varying densities. High density symbols (bar code element widths <0.007 inch) are, for example, used for small parts (e.g., integrated circuits) and for symbols with high information density. Low density symbols (bar code element widths >0.020 inch) are, for example, used for coding packages and containers in warehouses. As it is generally preferred that the beam scanned across the bar code symbol have a width comparable to that of the minimum width between regions of different light reflectivity (e.g., the minimum width of a bar element), different beam widths are needed to read different density bar codes. Furthermore, bar codes of the same density can be located at varying distances from the laser scanning head.

Conventional laser scanners have a condenser lens that focuses the laser beam so that the spot size is correct at the range at which the bar code reader is expected to operate. With such fixed focus systems, there is typically a "dead zone" in front of the scanner in which the spot size is too large for proper operation. Also, such scanners must be focused at the factory by adjusting the condenser lens along the optical axis while observing the spot size and then permanently setting the position of the lens at the position that achieves the desired size. This step is a relatively costly one, adding to the cost of manufacturing the laser scanner.

Various proposals have been made for improvements over these fixed focus imaging scanners. U.S. Pat. No. 4,920,255 shows a bar code reading system in which the range of the surface bearing the bar code is detected using an ultrasonic ranging system, and the detected range is used to prescribe the setting of the optics focusing a laser beam on the bar code (the output signal from the ultrasonic ranging system drives a stepper motor in the laser focusing optics). U.S. Pat. No. 4,831,275 discloses a variety of means for optically modifying the light reflected from the bar code symbol, to vary the distance at which the symbol is in focus on the photodetector within a bar code reader; the techniques taught include altering the shape of a lens, moving an aperture in the optical path, moving a mirror (or a fiber optic cable), and providing an array of sensors, each effectively focused at a different range. U.S. Pat. No. 4,333,006 discloses the use of a plurality of varying focal length holograms placed on a rotating disk to focus at differing overlapping distance ranges.

A number of proposals have been made to improve the operating depth of field for laser scanners. U.S. Pat. No. 5,723,851 describes a laser scanner incorporating multiple lasers focused for different operating ranges. U.S. Pat. No. 5,302,812 shows a laser scanning head in which the range of the beam waist is varied by moving a condenser lens. U.S. Pat. No. 4,808,804 discloses a number of systems for changing the working distance and/or the beam spot size of a laser beam by the light-transmissive properties of pupils or a movable laser light source.

Obtaining images that are free of errors and distortions introduced by the optical elements that are used in the imaging process has long been a goal of those working with imaging systems. Such systems contemplate the imaging of various kinds of objects, including but not limited to bar code symbols, alphanumeric and non-alphanumeric characters and symbols, and blocks of text. For convenience, all such objects are referred to herein as target objects, symbols, or indicia, whether they include encoded data or not. The errors and distortions introduced by the imaging system include, among others, lens aberrations, such as spherical and chromatic aberrations, misfocus errors resulting from an object being located away from the position of best focus, diffraction effects produced by aperture stops, and the diffusion effect associated with some indicia substrates.

An approach to reducing the magnitude of imaging errors is discussed in "Improvement in the OTF of a Defocussed Optical System Through the Use of Shaded Apertures", by M. Mino and Y. Okano, Applied Optics, Vol. 10 No. 10, October 1971. This article discusses decreasing the amplitude transmittance gradually from the center of a pupil towards its rim to produce a slightly better image. "High Focal Depth By Apodization and Digital Restoration" by J. Ojeda-Castaneda et al, Applied Optics, Vol. 27 No. 12, June 1988, discusses the use of an iterative digital restoration algorithm to improve the optical transfer function of a previously apodized optical system. "Zone Plate for Arbitrarily High Focal Depth" by J. Ojeda-Castaneda et al, SPIE Vol. 1319 Optics in Complex systems (1990) discusses use of a zone plate as an apodizer to increase focal depth. While all of these approaches achieve some improvement in image quality, they all have features that limit their usefulness in particular applications, such as bar code reading.

Another approach to reducing the magnitude of misfocus errors is to include appropriate phase masks in the imaging system. One example of this approach is described in U.S. Patent No. 5,748,371 (Cathey et al.). In this patent, the imaging system comprises a lens or lenses and an optoelectronic image sensor. It also includes a cubic phase mask (CPM) which is located at one of the principal planes of the imaging system, and which modifies the optical transfer function (OTF) of the imaging system in a way that causes it to remain approximately constant over some range of distances that extends in both directions (i.e., towards and away from the lens) from the distance of optimum focus. The intermediate image produced by the image sensor is then digitally post-processed to recover a final image which has a reduced misfocus error. While the image correcting technique described above produces results that are substantially better than the results produced by purely optical means, our efforts to use phase masks in imaging type optical readers using this technique have produced unsatisfactory results.

SUMMARY OF THE INVENTION

Briefly stated, the operating depth of field for a bar code scanner, preferably a laser scanner, is increased by placing a cubic phase mask (CPM) in the scanning beam. The masked beam is then scanned and reflected or scattered off a bar code and received by a photodetector. The received signal is then processed to recover the original unperturbed representation of the bar code pattern. The processed signal has an increased depth of field over an unmasked scanner signal.

According to an embodiment of the invention, an imaging system for imaging an object located in a target region includes an illumination source; an optical path between the illumination source and the object; a first optics assembly in the optical path; phase masking means in the optical path for receiving light and modifying a phase thereof as a function of position within the phase masking means, thereby creating phase modified light having known effects therein; means for traversing the phase modified light across the object in the target region; image sensing means for receiving light reflected from the object and producing an intermediate image signal therefrom; the intermediate image signal having at least a misfocus error that is dependent upon a distance between the first optics assembly and the object; and processing means for correcting for the known effects of the phase modified light to produce a final image signal of the object. The final image thus has a reduced amount of out of focus error over a range of distances.

According to an embodiment of the invention, a method of scanning for a laser scanning system suited for reading indicia located in a target region, including the steps of (a) generating an illumination beam for illuminating an indicia located in an operational depth of field; (b) changing locally a phase of the illumination beam as a function of position before the beam illuminates the indicia; (c) changing locally an amplitude of the illumination beam as a function of position before the beam illuminates the indicia; (d) receiving light reflected from the indicia; (e) converting the received light to an intermediate image signal; and (f) processing the intermediate image signal such that the operational depth of field is extended.

According to an embodiment of the invention, a method of modifying a laser beam to maximize the system resolving ability as a bar code indicia is moved throughout an operational depth of field includes the steps of (a) generating a laser illumination beam; (b) modifying a phase of the illumination beam a function of position in the beam; (c) modifying an amplitude of the illumination beam as a function of position in the beam; (d) scanning the phase and amplitude-modified beam across the bar code indicia; (e) receiving light reflected from the bar code indicia; (f) converting the received light to an intermediate image signal; and (g) processing the intermediate image signal using a precalculated recovery function to reduce effects of a position of the bar code indicia.

According to an embodiment of the invention, a method of scanning a barcode indicia, the indicia containing information encoded therein, includes the steps of (a) illuminating the indicia in an operating range with light; (b) modifying an amplitude and phase of the light to reduce variations in a localized illumination distribution of the light over the operating range before the light illuminates the indicia; (d) directing the light to the operating range; (e) scanning the light across the indicia; (f) receiving light scattered from the indicia; (g) converting the scattered light to an intermediate image signal; and (h) processing the intermediate image signal to recover the information encoded in the indicia.

According to an embodiment of the invention, a method of increasing an operating depth of field includes (a) providing illumination; (b) distorting a phase of the illumination in a predetermined manner at a specific distance from an object; (c) directing the distorted illumination to the object; (d) receiving light scattered from the object; (e) converting the received light to an intermediate image signal; and (f) processing the intermediate image signal using a precalculated recovery function to reduce effects of the specific distance.

BRIEF DESCRIPTION OF THE DRAWINGS

FIG. 3A shows an exemplary embodiment of a 1D imaging system that includes optical assemblies and digital signal processors of the type contemplated by the invention.

FIG. 3B shows an exemplary embodiment of a 1D imaging systems that includes optical assemblies and digital signal processors of the type contemplated by the invention.

FIG. 3C shows a front view of a 1D amplitude mask suitable for use in the embodiment of FIG. 3A.

FIG. 3D shows a side view of an optical element in which a focusing element, a phase mask and an amplitude mask are formed on different surfaces thereof.

FIG. 10 includes selected equations that illustrate terms and functions that are used in producing the recovery function of the invention.

FIG. 16A shows a high level block diagram of an imaging system that includes an optical assembly constructed in accordance with the invention and a digital signal processor that uses the generalized recovery function and recovery algorithm of the invention.

FIG. 17 shows a specific example of a 1-D laser scanning optical assembly that includes an amplitude mask and a phase mask that is suitable for practicing an embodiment of the invention.

FIG. 19A shows a scan profile made with a conventional laser scanner at a target distance of 410.0 mm.

FIG. 19B shows a scan profile made with a conventional laser scanner at a target distance of 402.0 mm.

FIG. 19C shows a scan profile made with a conventional laser scanner at a target distance of 391.0 mm.

FIG. 19D shows a scan profile made with a conventional laser scanner at a target distance of 378.0 mm.

DETAILED DESCRIPTION OF THE PREFERRED EMBODIMENT

Original material from parent application.

Figure 1:
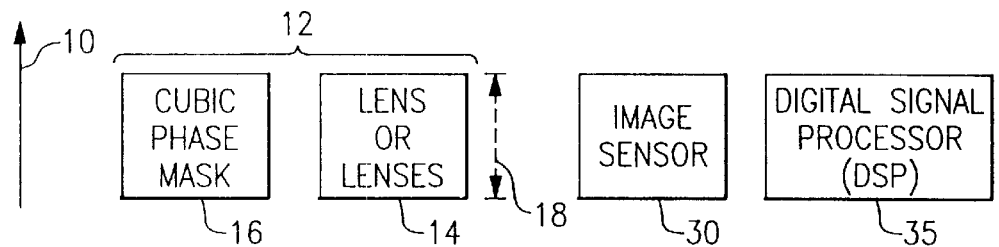
FIG. 1 shows a high level block diagram of a prior art imaging system that includes a cubic phase mask and a digital signal processor that uses a known recovery function and a known image recovery algorithm.

Referring to FIG. 1 there is shown a prior art imaging system which is configured to produce a digital representation of an object 10. This imaging system includes an optical assembly 12 having a lens or set of lenses 14 and a phase mask 16 which is preferably, although not necessarily, of the cubic type or at least of the type which can be specified in terms of a third order polynomial. The exit pupil of optical assembly 12 may be defined either by an aperture stop (not shown) or by the lateral dimensions of one of its lenses, as indicated generally by the dotted line labeled 18. The imaging assembly of FIG. 1 also includes an opto-electronic image sensor 30 for receiving the real intermediate image of object 10 formed thereon by optical assembly 12, and converting that light image into an intermediate image signal which, after undergoing an analog to digital conversion, becomes a digital intermediate image signal that is made up of a number of discrete image data elements. Finally, the imaging system of FIG. 1 includes a digital signal processor (herein often abbreviated to DSP) that stores and post-processes the image data elements of the intermediate image signal to produce a set of final image data elements which has been corrected in the manner described in U.S. Pat. No. 5,748,371, which is hereby incorporated herein by reference.

As explained in the above-mentioned patent, phase mask 16 is placed at a principal plane of lens 14, and causes the OTF of the imaging system to remain approximately constant over some range of distances from the in-focus position. DSP 35 stores and post-processes the intermediate image signal produced by image sensor 30 to produce a corrected digital recovered (final) image signal which has a reduced amount of out of focus error over a range of distances. This is stated to be accomplished by implementing a recovery function that is based upon an approximated system OTF.

While post-processing of the intermediate image signal of the imaging system of FIG. 1 in this manner does reduce the out of focus error thereof, the magnitude of this reduction is suboptimal. In particular, the system OTF approximation fails to take into account an abrupt change in phase at the origin of the incoherent OTF (as defined in the above cited patent) that is produced by the cubic phase mask. This, in turn, causes the final image produced by DSP 35 to have substantial distortion.

In addition to including the above-mentioned residual out of focus error, the recovered images produced by the imaging system of FIG. 1 will include the uncompensated errors introduced by the elements of its optical assembly. These errors may include coma associated with lens 14 and diffraction errors produced by aperture stop 18, among others. Together with the partly corrected out of focus error, these errors can result in recovered images which are too distorted to be useful in devices, such as optical readers, which operate best when they are presented with images that have sharply defined black-white and white-black transitions.

During the making of the invention, it was discovered that there exists a deficiency in the above-discussed method for reducing out of focus error, and that this deficiency can be corrected in a way that simultaneously corrects for a variety of other imaging system errors. It was also discovered that this more powerful and more inclusive type of correction can be accomplished without significantly increasing the amount of image processing that must be done. As explained more fully later, the method of the invention in part involves the making of improvements to the optical assembly of the imaging system, and in part involves the making of improvements to the techniques used in post-processing the image signal produced thereby.

Figure 2:
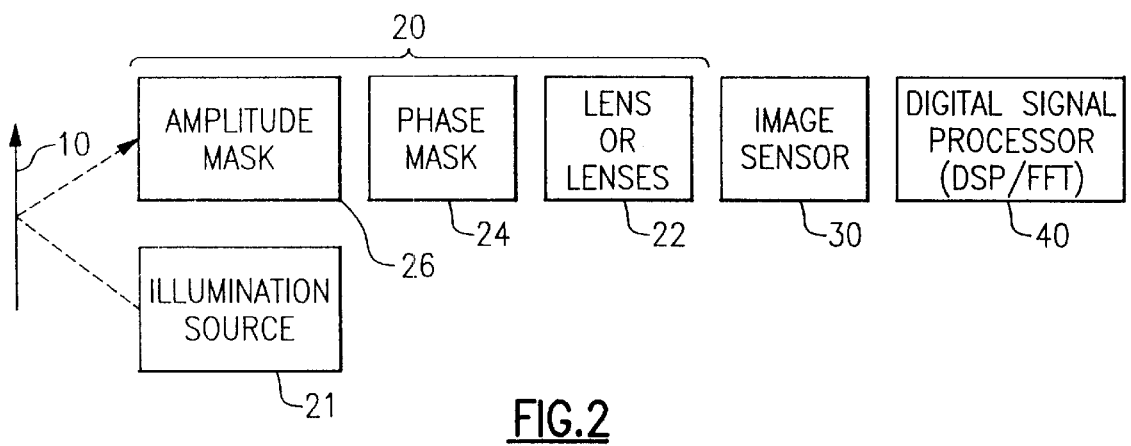
FIG. 2 shows a high level block diagram of an imaging system that includes an optical assembly constructed in accordance with the invention and a digital signal processor that uses the generalized recovery function and recovery algorithm of the invention.

In FIG. 2 there is shown the overall configuration of an imaging system constructed in accordance with the method and apparatus of the invention. The imaging system of FIG. 2 includes an incoherent illumination source 21, an optical assembly 20 having a lens or set of lenses 22, a phase mask 24, and an amplitude mask 26 which preferably, although not necessarily, has a Gaussian transmission profile. A number of exemplary physical embodiments of optical assembly 20 are described with reference to FIGS. 3A, 3B, 3C, 5A and 5B. The imaging system of FIG. 2 also includes an image sensor 30 for receiving the intermediate image formed by optical assembly 20 and converting that image into an intermediate image signal that, after A/D conversion, becomes a digital intermediate image signal which is made up of a plurality of discrete image data elements. Finally, the imaging system of FIG. 2 includes a DSP 40 for storing and post-processing the digital intermediate image signal in accordance with a recovery algorithm that uses the improved, generalized recovery function of the invention, this difference being indicated by the assignment of a new number 40. This recovery algorithm and function are described later with reference to FIGS. 8 and 9A.

Referring to FIG. 3A there is shown a side view of a first embodiment of a 1D imaging system constructed in accordance with the invention. This imaging system includes a 1D optical assembly 20-1, a 1D image sensor 30-1, and a DSP 40-1 which is adapted to implement a 1D version of the recovery function of the invention. In the embodiment of FIG. 3A optical assembly 20-1 includes a lens 22-1, a 1D phase mask 24-1 (the curvature of which is greatly exaggerated to clearly show its shape), and a stand alone 1D amplitude mask 26-1. In the preferred embodiment, 1D amplitude mask 26-1 is rectangular in form. As shown in FIG. 3C, the transmittance of mask 26-1 decreases smoothly and continuously as a function of the distance from the center line of the amplitude mask, along the X-axis until it reaches or approximates a value of zero at the X boundaries X1 and X2 thereof. This center line is located on the optical axis of optical assembly 20-1. This optical axis is perpendicular to the plane the object shown in FIG. 3C. The transmittance of mask 26-1 is invariant in directions parallel to the Y axis of assembly 20-1 and, when used with a 1D image sensor, approximates an aperture that is unbounded in that direction. Although apertures having other shapes can be used, they result in recovery algorithms or functions that are significantly more complex than those for a rectangular aperture and, consequently, are not preferred.

Phase mask 24-1 is located at or near the front principal plane of lens 22-1 and preferably, although not necessarily, has a phase characteristic which is cubic in form, i.e., which can be specified by a third order polynomial. During imaging, phase mask 24-1 operates in a known manner to cause the OTF of optical assembly 20-1 to remain approximately constant over a range of distances that extends in both axial directions from the location of optimum focus (i.e. towards and away from the lens). In the preferred embodiment, the coefficients of the cubic or third order polynomial function are selected according to the maximum amount of misfocus that the imaging system is designed to accommodate, and are just sufficient to compensate for that degree of misfocus. Even though the phase mask technique can compensate certain other types of errors, such as spherical aberration, it is contemplated in the invention that all such known errors are compensated, if possible, in the recovery function, and the phase mask technique will be used to correct only misfocus error, which is not known a priori. This assures that the size of the PSF that results from the presence of the phase mask is no larger than is actually required, and does not unnecessarily decrease the signal to noise ratio of the digital intermediate image signal. The magnitude of the cubic phase function parameter is related to the size of the aperture of the optical assembly and the cubic phase coefficient in the manner indicated by Equation 8 of FIG. 10.

Figure 7A:
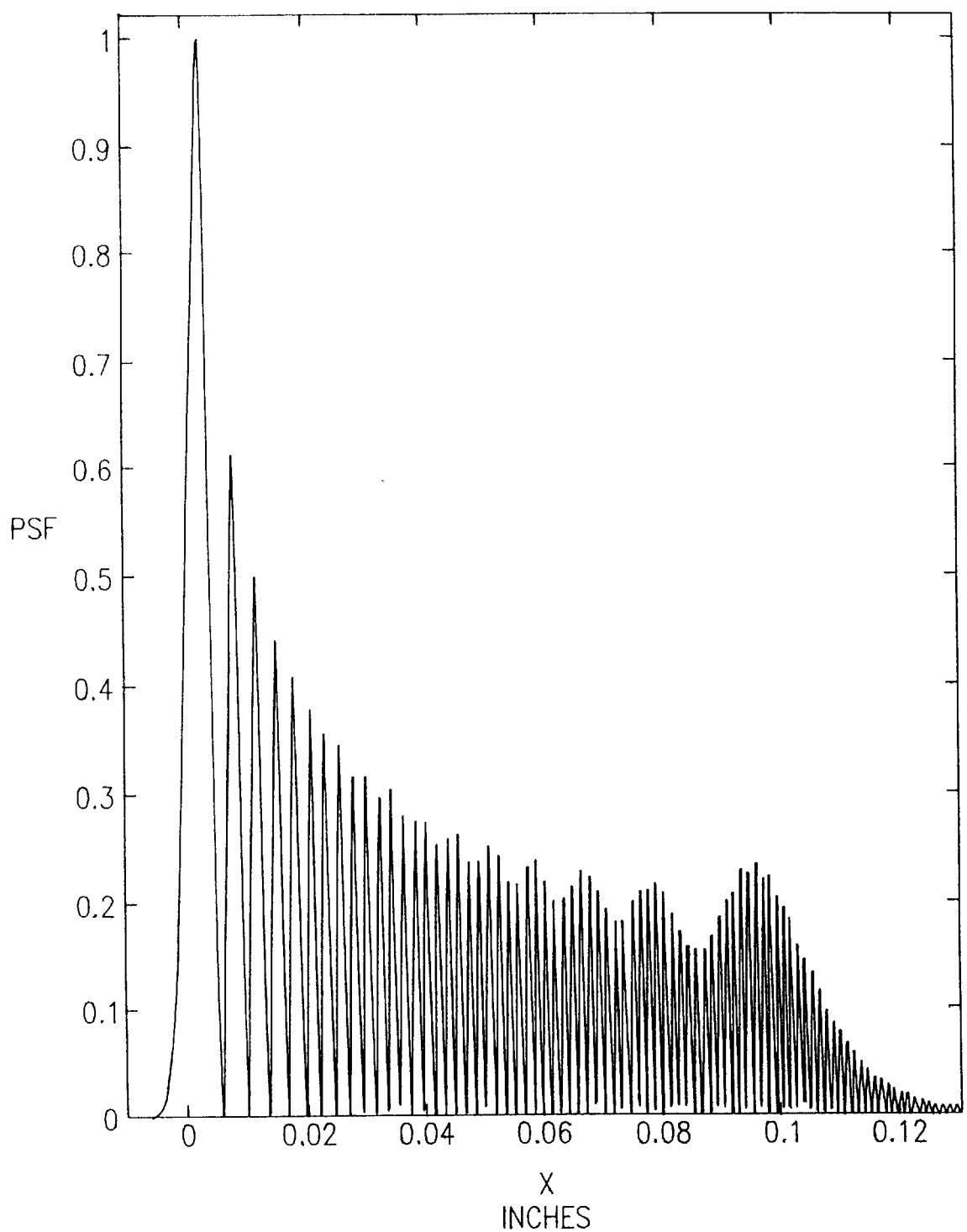
FIG. 7A shows the calculated in-focus line spread function for a 1D imaging system having an optical assembly with a sharply defined aperture and a CPM.
Figure 7B:
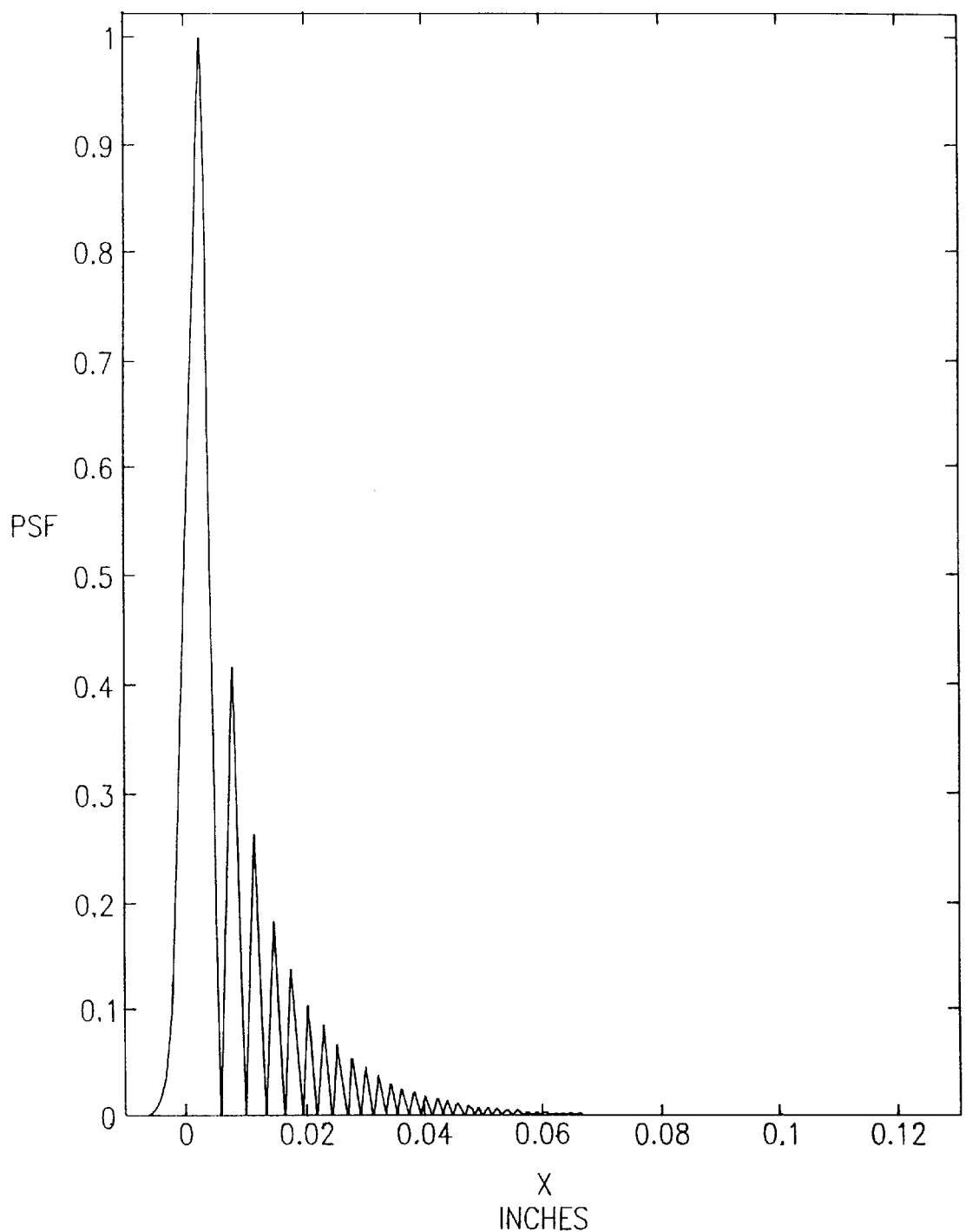
FIG. 7B shows the calculated in-focus line spread function for a 1D imaging system similar to that of FIG. 7A, except that it has an optical assembly which includes an amplitude mask having a Gaussian transmission profile.
Figure 7C:
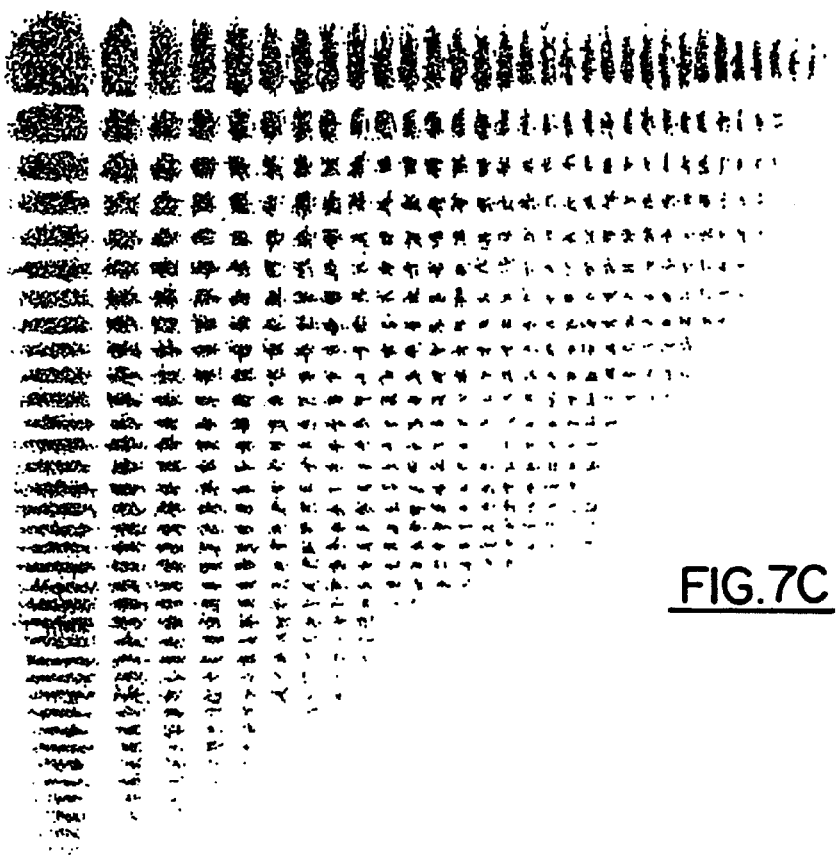
FIG. 7C shows the measured in-focus point spread function for a 2D imaging system having an optical assembly with a sharply defined aperture and a CPM.
Figure 7D:
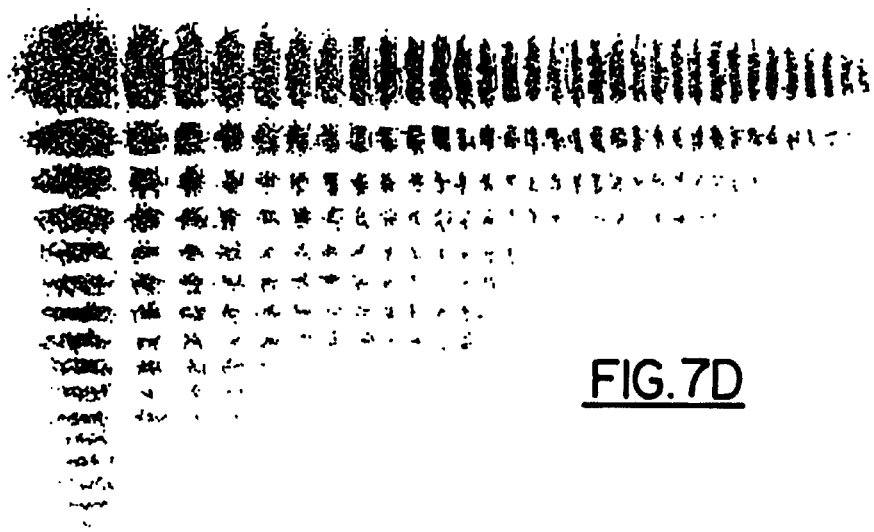
FIG. 7D shows the measured in-focus point spread function for a 2D imaging system similar to that of FIG. 7C, except that it has an optical assembly which includes an amplitude mask having a Gaussian transmission profile.

The presence of amplitude mask 26-1 represents a departure from and improvement over imaging systems that have previously been used in indicia readers. This amplitude mask defines for the imaging system as a whole a "soft aperture" which reduces the magnitude of the diffraction ripples that are associated with the intermediate PSF in optical assemblies that have "hard apertures" i.e., aperture stops with sharply defined edges. This amplitude mask has the effect of smoothing out the intermediate image PSF. This smoothing may be seen by comparing FIG. 7A, which shows the in-focus intermediate image PSF of a 1D optical assembly which has a "hard aperture", and FIG. 7B, which shows the intermediate image PSF of an optical assembly such as that shown in FIG. 3A which includes a 1D Gaussian amplitude mask. Amplitude mask 26-1 that has a Gaussian characteristic provides the additional advantage that it causes the intermediate image PSF to have an envelope shape that does not change as much over a depth of focus as that of an optical system implemented without an amplitude mask. A mathematical function which describes a 1D amplitude mask that has Gaussian characteristics is shown in Equation 4 of FIG. 10.

While FIG. 3A shows amplitude mask 26-1 as a stand alone mask, it is not essential that it be a stand alone element. Mask 26-1 may, for example, be formed on or as a part of phase mask 24-1 or lens 22-1. Mask 26-1 may also be formed as a part of a single, composite element that combines the functions of all of lens 22-1, phase mask 24-1 and amplitude mask 26-1. A single element of this type is shown in FIG. 3D. In the latter figure, a single, composite optical element 27 includes a front surface 22-A which serves as a focusing structure, a rear surface 24-A which serves as a phase mask, and a coating 26-A which serves as an amplitude mask.

If the transmittance of the mask is made to become equal to zero before another optical element, such as a lens, limits the aperture of the optical assembly, then the locus of points at which the transmittance becomes equal to zero defines the aperture stop of the optical assembly, without regard to where the physical edges of the mask are. If the transmittance of the mask has a non-zero value at the edges of the mask, and no other optical element defines a smaller aperture stop for the optical assembly, the edges of the mask define the aperture stop of the optical assembly. In the latter case, the fact that the transmittance is not equal to zero at the edge of the mask does not prevent the mask from establishing the desired soft aperture, provided that the transmittance is small enough to not be of practical significance.

In addition, mask 26-1 may define an amplitude mask having a non-Gaussian transmission profile, provided that the change in its transmittance has a gradient or curvature that decreases smoothly across the width of the mask. Examples of non-Gaussian functions that may be suitable for use in establishing such smoothly decreasing gradients include exponential and Bessel functions, and segments of cosine functions.

Sensor 30-1 may be any of a number of different types of opto-electronic image sensors, including CCD, CID and CMOS sensors, among others. Sensor 30-1 should have enough photosensitive elements to provide a spatial sampling resolution sufficient to meet the requirements of the application in which the imaging system is used. For many 1D bar code reading applications, an image sensor having an imaging array with 600 or more photosensitive elements is sufficient. The image data produced by these photosensitive elements taken together comprise an intermediate image signal that corresponds to the real intermediate image that was formed on the imaging array of the image sensor. In order for this intermediate image signal to be post-processed in accordance with the invention, it must first be stored in memory. As a result, the intermediate image signal must have a digital , e.g., gray scale, format. Accordingly, if the image sensor is not one that makes its output available as a digital intermediate image signal, it should be converted to such a signal by a suitable A/D converter.

While the intermediate image appearing at the active surface of image sensor 30-1 is a continuous image, the digital intermediate image signal is a discontinuous image that is made up of a plurality of discrete image data elements. Each of these elements has an amplitude which is proportional to the time averaged result of the superposition of the squares of the absolute values of the coherent PSFs of all points of the object that are projected onto the respective photo sensitive elements. As explained more fully later, it is the function of DSP 40-1 to recover a representation of the original object which has been compensated for misfocus and for as many of the errors introduced by the associated optical assembly as is practicable. This operation is referred to herein as the "recovery process" or "recovery algorithm", and makes use of the generalized recovery function of the invention.

Referring to FIG. 3B there is shown a second embodiment of a 1D imaging system constructed in accordance with the invention. The embodiment of FIG. 3B differs from that of FIG. 3A primarily in that its phase mask 24-2 is located at the rear rather than the front principal plane of its lens 22-2. In addition, the amplitude mask 26-2 of the imaging system of FIG. 3B takes the form of a film deposited on the rear surface of phase mask 24-2. Because the statements made in connection with the embodiment of FIG. 3A are equally applicable to the embodiment of FIG. 3B, the embodiment of FIG. 3B will not be discussed in detail herein.

As appreciated by those skilled in the art, it is the 1D character of image sensor 30-1 or 30-2 that is responsible for the fact that the imaging systems of FIGS. 3A and 3B are termed 1D imaging systems. As a result, in spite of the fact that the imaging systems of FIGS. 3A and 3B are 1D imaging systems, optical assemblies 20-1 and 20-2 may be constructed using either 1D or 2D versions of their phase and amplitude masks or any convenient combination thereof. Lenses 22-1 and 22-2, on the other hand, are preferably 2D lenses. It is understood that all such versions and their equivalents are within the contemplation of the present invention.

Figure 4:
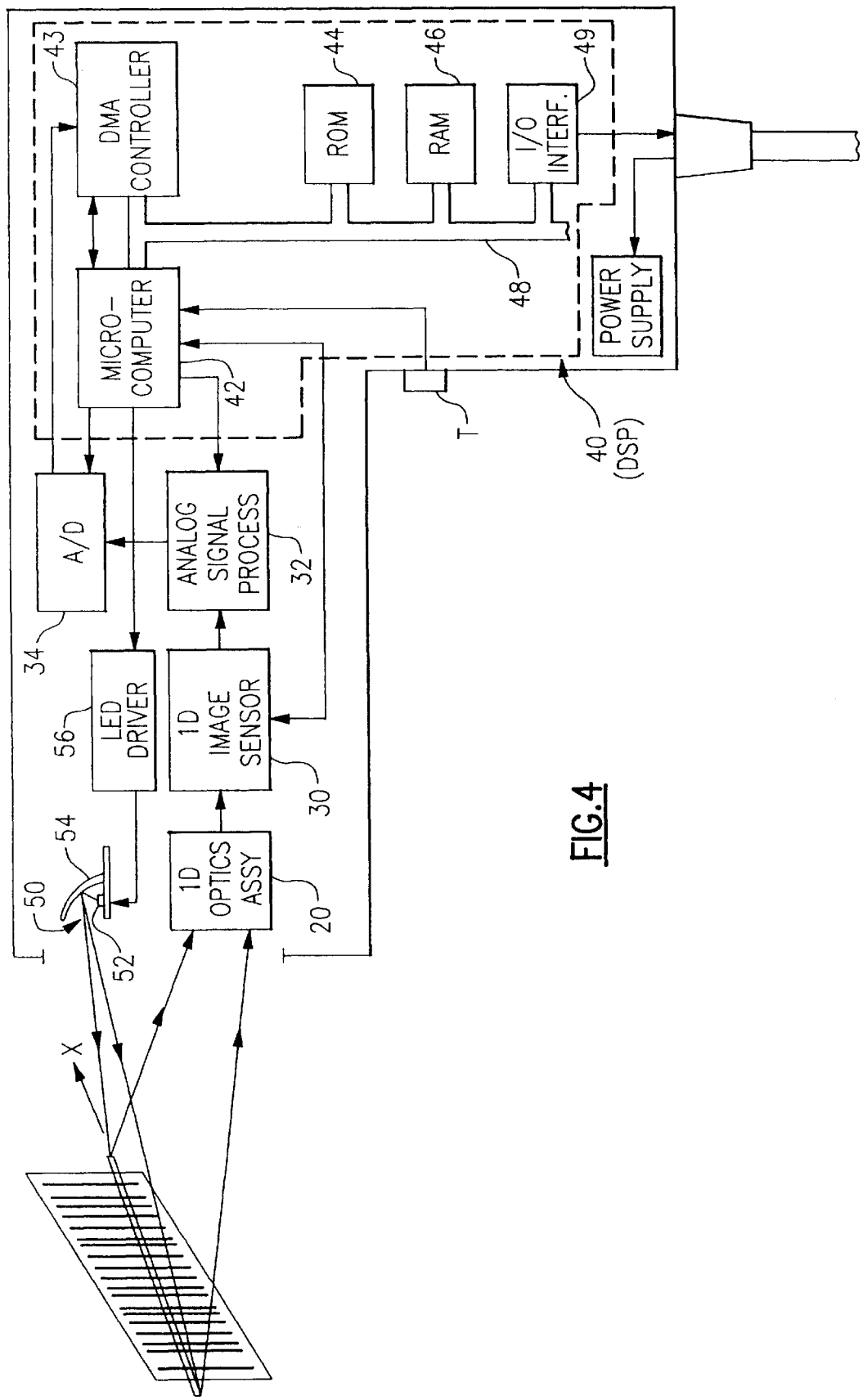
FIG. 4 shows an opto-electronic block diagram of a 1D optical reader which includes an imaging system of the type shown in FIG. 3A or FIG. 3B.

Referring to FIG. 4 there is shown a block diagram of an apparatus in which the imaging systems of FIGS. 3A and 3B can be used, namely: a 1D hand held bar code reader. In addition to optical assembly 20 and image sensor 30 this reader includes an illumination system 50 which includes a linear array of LEDs 52 and a focusing mirror 54 together with a suitable LED driver circuit 56. Most of the remainder of the reader of FIG. 4 comprises the circuit elements that have thus far been referred to collectively as DSP 40. These circuit elements include an analog signal processing circuit 32 and an analog to digital converter 34 for converting the analog output signal of image sensor 30 into an intermediate image signal that can be processed using digital methods. These circuit elements also include microcomputer 42, a read only memory (ROM) 44, a read write memory (RAM) 46, and a bus 48 for interconnecting them. A suitable DMA controller 43 may also be included in order to handle the storage of image data, thereby allowing computer 42 to concentrate on the tasks of post-processing the digital intermediate image signal to recover and decode the final image data. The operation of the reader of FIG. 4 will typically be initiated either manually, by means of a suitable trigger T, or non-manually by means of an autotrigger arrangement.

The overall operation of the reader of FIG. 4 is controlled by a program stored in ROM 44. Generally speaking, this program includes a reader control portion, a decoding portion, and an image recovery portion. The reader control portion of the program deals with matters such as the starting and stopping of scanning, and the inputting and outputting of data via an I/O interface 49. The decoding portion deals with matters such as identifying the symbology used in the symbol being read and the decoding of that symbol in accordance with the rules that govern that symbology. Because programs for performing these functions are included in commercially available readers, such as the model numbers ST 3400 and IT 4400 readers sold by the assignee of the present invention, they will not be discussed in detail herein. The image recovery portion of the program is discussed later in connection with FIGS. 9A and 9B.

Figure 5A:
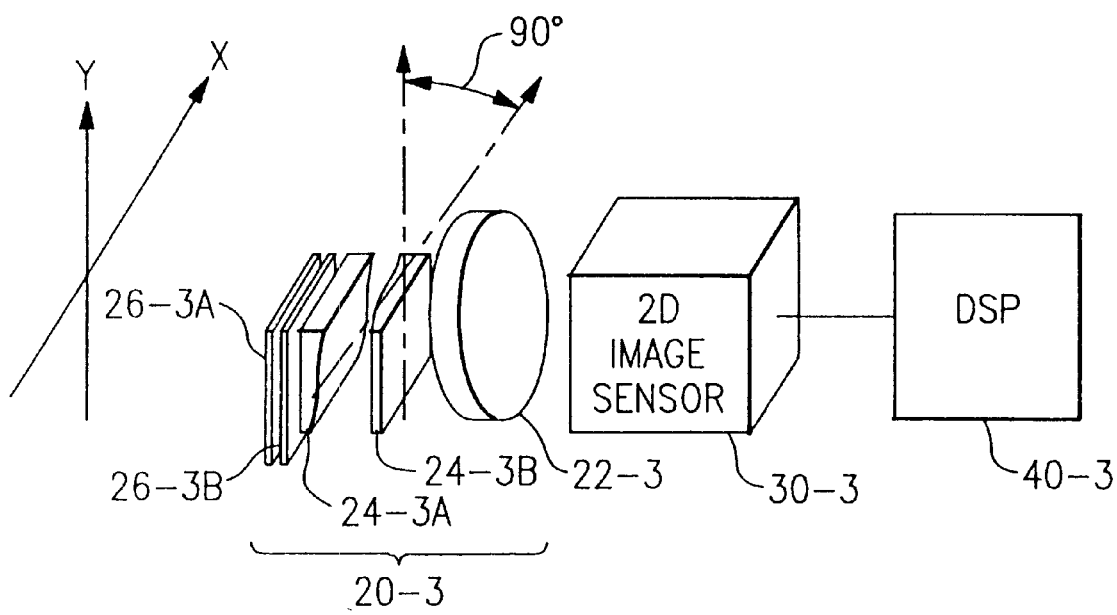
FIG. 5A shows an exemplary embodiments of a 2D imaging system that includes optical assemblies and digital signal processors of the type contemplated by the invention.
Figure 5B:
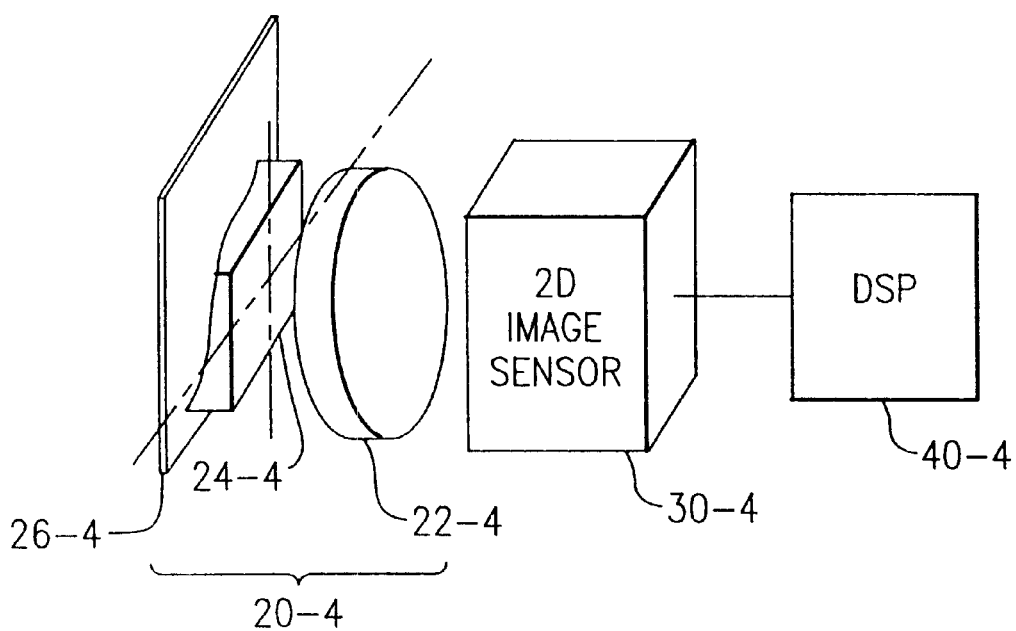
FIG. 5B shows an exemplary embodiments of a 2D imaging system that includes optical assemblies and digital signal processors of the type contemplated by the invention.

Referring to FIGS. 5A and 5B there are shown two embodiments of 2D imaging systems that are constructed in accordance with the invention. As in the case of the 1D embodiments of FIGS. 3A and 3B, the 2D embodiments of FIGS. 5A and 5B each include an optical assembly, an image sensor, and a DSP, each of which is labeled with the same number used in earlier discussed embodiments, except for changes in postscript. In the embodiment of FIG. 5A, the lens 22-3 is a 2D lens similar to that used in the 1D embodiments of FIGS. 3A and 3B. The phase and amplitude masks of FIG. 5A are similar to their counterparts in FIG. 3A, except that they are preferably square and provide for the additional dimension in a rectilinear manner. The amplitude mask of FIG. 5A is made up of two identical 1D amplitude masks 26-3A and 26-3B which are oriented at right angles to one another. With this angular orientation, the two 1D amplitude masks together function as a 2D amplitude mask. The 2D amplitude mask may also be made as a single element. Similarly, the phase mask of FIG. 5A is made up of two identical 1D phase masks 24-3A and 24-3B which are oriented at right angles to one another. With this angular orientation, the two 1D phase masks together function as a single 2D phase mask to facilitate the compensation of misfocus error in 2D images. The 2D phase mask may also be made as a single element 24-4, as shown in the embodiment of FIG. 5B. Since the other statements made earlier with reference to the optical assemblies of FIGS. 3A and 3B are equally applicable to the optical assemblies of FIGS. 5A and 5B, except for the effect of the added dimension, the optical assemblies of FIGS. 5A and 5B will not be further discussed herein.

Unlike the image sensors shown in FIGS. 3A and 3B, the image sensors shown in FIGS. 5A and 5B are 2D image sensors and, consequently, will have hundreds of times the number of photosensitive elements as their 1D counterparts. In addition, the DSPs of FIGS. 5A and 5B, although not substantially different from their counterparts in FIGS. 3A and 3B from an electrical standpoint, are arranged to use recovery algorithms which can apply either 1D or 2D recovery functions, depending on how they are used. If, for example, a 2D image sensor images a 2D matrix bar code symbol, the reader should apply a 2D recovery function. If, on the other hand, a 2D image sensor images a 1D bar code symbol two-dimensionally, it should also be able to take a 1 D slice of the stored representation of that symbol and process that slice in accordance with a 1D recovery function. It will therefore be understood that there is no inherent relationship between the number of dimensions that characterize the recovery functions of the invention and the number of dimensions that characterize the image sensors with which these functions are used.

Although 2D recovery functions are more complex than their 1D counterparts, they are equally familiar to those skilled in the art. Accordingly, in order to avoid needless repetition, the present description will frame its discussion of the recovery algorithm and its recovery function in terms of a 1D intermediate image signal, and leave it to those skilled in the art to adapt the description as necessary to process a 2D intermediate image signal.

A specific example of a 2D optical assembly that includes an amplitude mask that is suitable for practicing an embodiment of the present invention is shown in Table 1 below.

TABLE 1

(Reference the equations of FIG. 10.)

| | |
|---|---|
| $C03 = 0.0787$ $(1/inch)^2$ | cubic coefficient for CPM |
| $n = 1.489$ | refractive index of CPM (acrylic) |
| $f = 7.93$ inch | focal length of biconvex lens |
| $\lambda = 660$ nm | wavelength of light |
| $p = q = 15.859$ inch | image and object distances |
| element separation = 7.4 $\mu$m | SONY ICX084AL 2D imager element separation |

TABLE 1-continued (Reference the equations of FIG. 10.)

| | |
|---|---|
| imager array = 659 × 494 elements | imager array format |
| σ = 0.239 inch | Gaussian coefficient |

Figure 6:
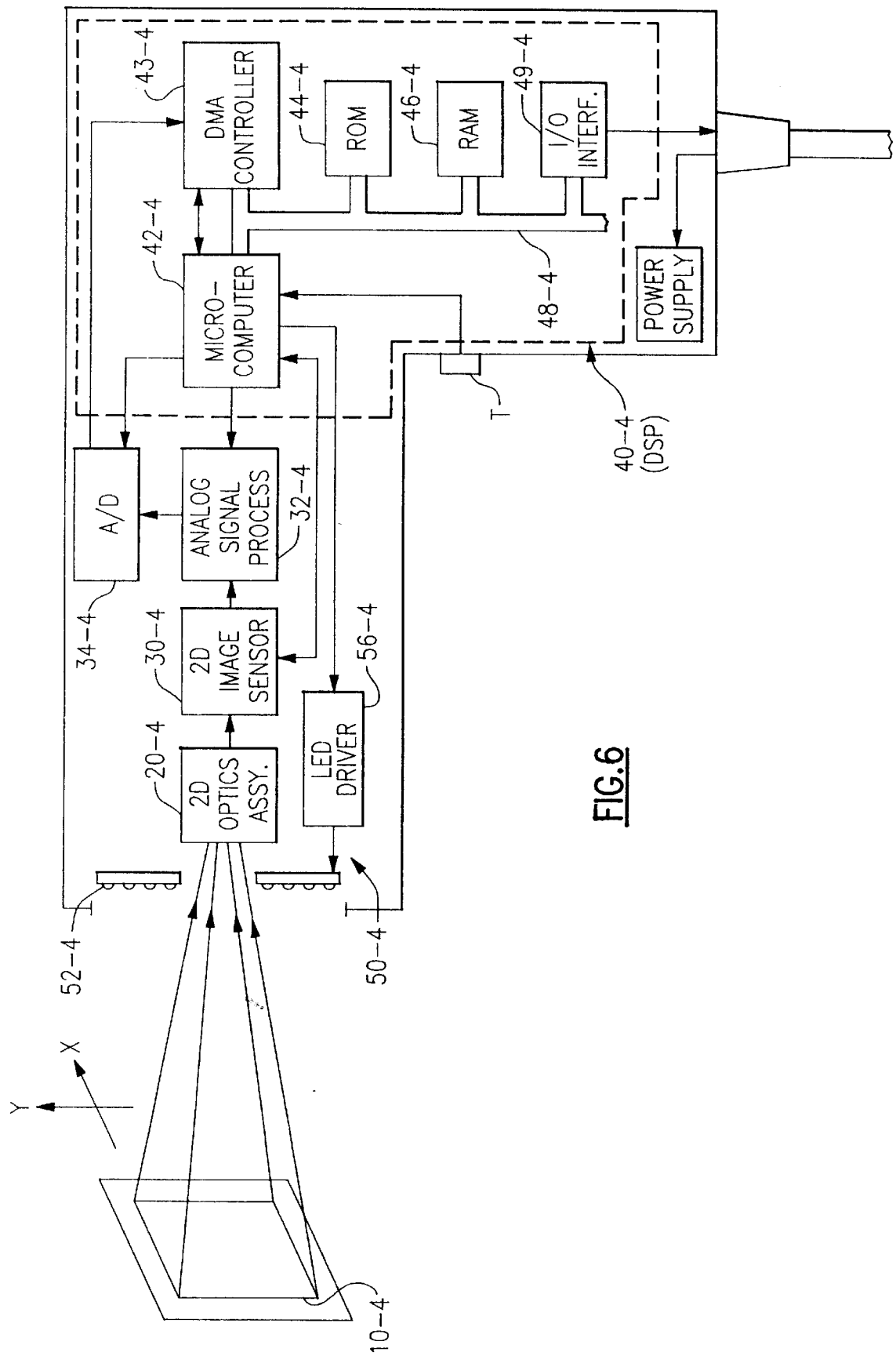
FIG. 6 shows an optical-electronic block diagram of a 2D optical reader which includes an imaging system of the type shown in FIG. 5A or FIG. 5B.

Referring to FIG. 6, there is shown an opto-electronic block diagram of one exemplary 2D bar code reader that is suitable for use with the present invention. In addition to a 2D optical assembly and a 2D image sensor, such as 20-4 and 30-4 of FIG. 5B, this reader includes an illumination system 50-4 which includes a 2D array of LEDs 52-4 together with a suitable LED driver circuit 56-4. Most of the remainder of FIG. 6 comprises the circuit elements which have thus far been referred to as DSP 40-3 or 40-4. These circuit elements include an analog signal processing circuit 32-4 and an A/D converter 34-4 for converting the output signal of image sensor 30-4 into a digitally processable representation of the 2D intermediate image of object 10-4. These circuit elements also include microcomputer 42-4, a ROM 44-4, a RAM 46-4 and a bus 48-4 for interconnecting them. A suitable DMA controller 43-4 may also be included to handle the storing of 2D image data, thereby allowing computer 42-4 to concentrate on the tasks of post-processing the image data to recover and decode the final image. Since a DMA controller of this type is used in known, commercially available bar code readers, such as in the earlier mentioned model IT 4400 reader, this controller will not be further described herein.

Because a 2D image includes thousands of image data elements, and because these data elements will ordinarily be processed using a suitable transform pair, such as the Discrete Fast Fourier Transform (DFFT) and Inverse Discrete Fast Fourier Transform (IDFFT), the DSP of the invention may also include a dedicated circuit, which may take the form of an ASIC, for performing these transforms. Equivalently, the DSP may be provided with a second, general purpose DSP (not shown) which is dedicated to executing the routines which implement the DFFT-IDFFT transform pair, and making the results available to main DSP 42-4. If such a second DSP is used, other tasks, such as the application of the recovery function and the execution of decoding programs may be divided up in various ways between them. It will therefore be understood that the present invention is not limited to the use of any particular number of microcomputers and/or DSPs or to any particular allocation of tasks among them, and that all such numbers and allocations are within the contemplation of the invention if they use the image recovery techniques discussed herein or their equivalents.

The overall operation of the reader of FIG. 6 is controlled by a program stored in ROM 44-4. Generally speaking, this program includes a reader control portion, a decoding portion and an image recovery portion. As in the case of the 1D reader of FIG. 4, the reader control and decoding portions of 2D reader of FIG. 6 are of types known to those skilled in the art and is not discussed in detail herein. The image recovery function, and the overall image recovery process of which the recovery function forms a part, is now described with reference to FIGS. 8 through 10.

Figure 8:
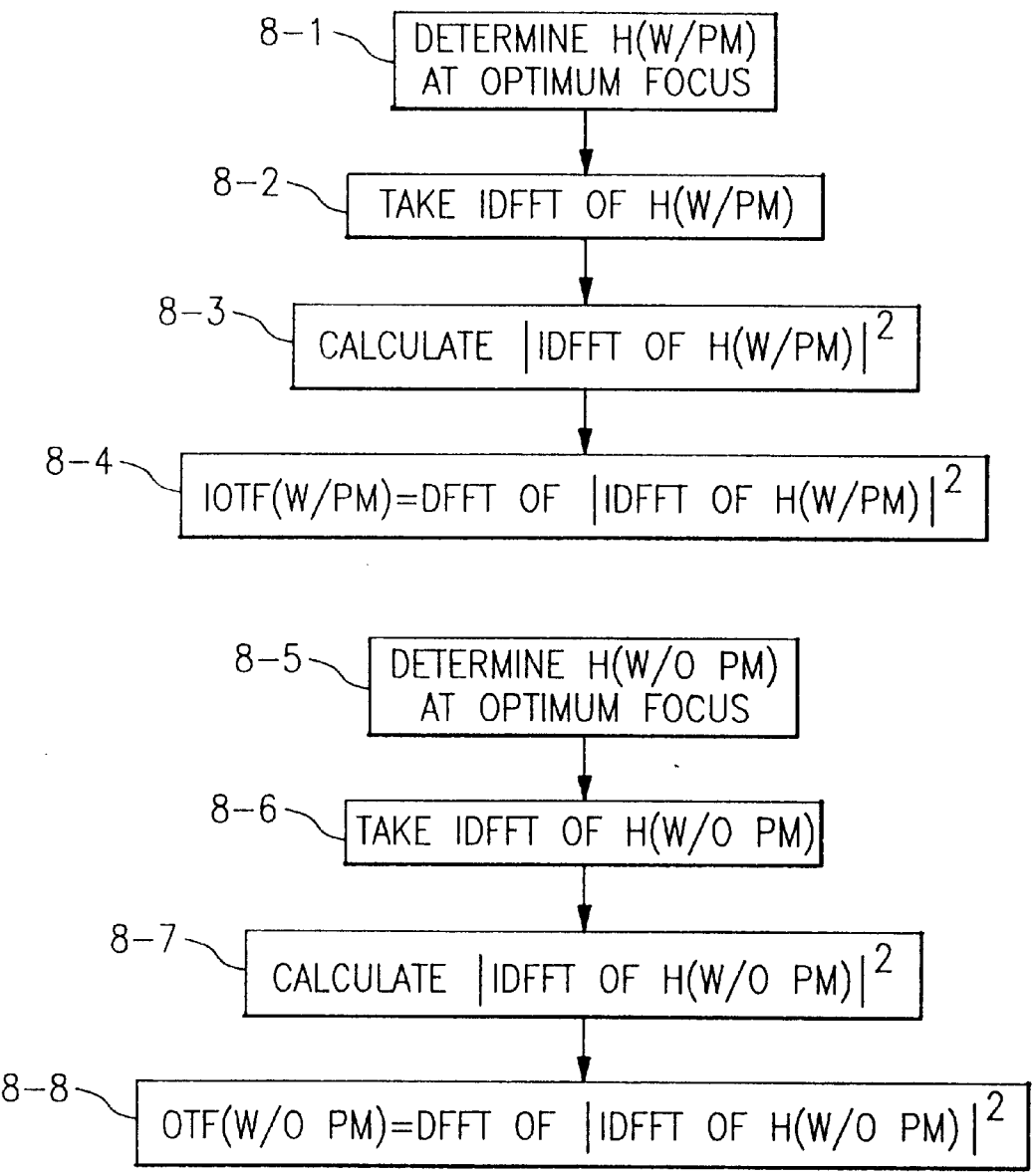
FIG. 8 illustrates the steps used to produce exemplary forms of the recovery function of the invention.

Referring to FIG. 8, there is shown a high level representation of one exemplary sequence of steps that may be used to produce the preferred embodiment of the generalized recovery function of the invention. The first of these steps, 8-1, includes the determination of the calculated generalized pupil function of the optical assembly as it exists under a condition of approximately optimum focus, with the phase mask in place, a quantity which is referred to herein as H(W/PM). This pupil function is equal to the product of a plurality of terms, each of which comprises a mathematical function that specifies a respective one of the characteristics of the elements of optical assembly 20. Principal among these functions are: an aperture function which mathematically describes of the amplitude mask 26 and the effect of other optical elements, if any which act as an aperture stop, a phase mask function that mathematically describes phase mask 24, and a lens function 22 that mathematically describes the lens. In the event that the amplitude mask alone defines the aperture stop of the optical assembly, as may be the case when the transmittance of the mask is made to equal zero before its physical boundaries are reached, the aperture function becomes the same as the function which mathematically describes the amplitude mask, and may properly be referred to as an amplitude mask function. This pupil function may also include other terms (other than an out of focus term) that mathematically describe effects which are able to introduce errors into the image which the optical assembly produces on image sensor 30, such as spherical aberrations or astigmatism in the entire optical system (such as the window). An out of focus term is not included because, as stated earlier, the calculated pupil function is calculated under a condition of approximately optimum focus. The specific focus conditions are not known a priori and therefore can not be put into a generalized recovery function. The recovery function is calculated from the calculated pupil function. Since the recovery function can reduce the error associated with an effect only if that effect is taken into account in the calculated pupil function, it is desirable to include in the calculated pupil function terms that represent as many error producing effects as is practicable.

The mathematical expression which describes the pupil function depends on the actual sizes, shapes and locations of each physical element that forms a part of the optical assembly, and cannot therefore be written out in exact numerical form independently of the optical assembly to which it relates. It can, however, be written out in symbolic form, and when so written out, has the general form and includes terms such as those shown in Equation 1 in FIG. 10. Examples of equations that show the mathematical forms of the terms that are included in Equation 1 are included as Equations 4 through 6 of FIG. 10. Of these, Equation 4 shows a Gaussian amplitude mask function, Equation 5 shows a cubic phase mask function, Equations 6 and 7 together show aberration functions. Further information concerning the last mentioned function may be found on page 2–19 of Handbook of Optics, edited by W. G. Driscoll and W. Vaughan, McGraw-Hill, 1978. This formulation assumes that all of the physical objects in the optical assembly can be considered to be located in the plane of the exit pupil. If this is not the case, then the mathematical functions describing the individual objects can be mapped or referred to the plane of the exit pupil. Those skilled in the art will understand why this is desirable and how it can be accomplished.

After the approximately in-focus generalized pupil function has been determined, the next step in producing the recovery function of the invention is to produce a mathematical representation of the incoherent optical transfer function (IOTF) of the optical assembly at approximately best focus, with the phase mask in place, a quantity which is referred to herein as IOTF(W/PM). This representation may be generated in either of two ways. One is to calculate the autocorrelation function of H(W/PM) directly, using equations known to those skilled in the art as, for example, are described on page 139 of the above-cited book by Goodman. An equation of this type is included herein as Equation 2 of FIG. 10. Although this calculation is time consuming, its use is practical because it need be done only once, during the design phase of a new imaging system, rather than each time a new image is to be processed. The second, preferred way of producing the IOTF includes carrying out steps 8-2 through 8-4 of FIG. 8. These include taking the IDFFT of H(W/PM), squaring its absolute value, and taking the DFFT of that squared absolute value. These and all substantially equivalent methods for generating the IOTF(W/PM) of the optical assembly is understood to be within the contemplation of the invention.

In the spatial frequency domain, the inverse (in the sense of reciprocal) of the IOTF(W/PM) may be used by itself as the recovery function, albeit in its simplest, least practical form. Although this form may be viable in principle, it is not practical for use in real systems because of the impact of noise, truncation errors, and other calculation errors. A more practical form of the recovery function can be produced, however, if IOTF(W/PM) is used as the denominator of a fraction, the numerator of which is the IOTF without the phase mask, or other aberrations at approximately optimum focus, namely IOTF(W/OPM). As in the case of the IOTF (W/PM), the IOTF(W/OPM) may be produced by calculating the ideal generalized pupil function without the phase mask, error or aberrations, but with the amplitude mask of the optical assembly, H(W/OPM), as shown in step 8-5 of FIG. 8, and then either taking the autocorrelation of H(W/OPM) or performing the steps 8-6 through 8-8 of FIG. 8. When the result, IOTF(W/OPM), is divided by IOTF(W/PM), as shown in FIG. 8, the resulting fraction comprises the basic recovery function of the present invention. The use of this recovery function is discussed presently in connection with FIGS. 9A and 9B.

When calculating the numerator and/or denominator, it is understood that for a specific practical application one may want to optimize the system about a position other than the position of optimum focus. It is understood that the use of the non-optimum focus condition for the generation of a recovery function is also within the scope of this invention.

The above-discussed, basic recovery function of the invention may be further improved by multiplying it by a further filtering, waveshaping or finishing function, hereinafter referred to as FILTER, which serves to optimize the basic recovery function by altering the shape thereof, and thereby giving it a more "finished" form. This filtering function is a function which may be arrived at either empirically or by calculation, and which takes into account the problems associated with particular applications. These may include problems such as image contrast, the diffusion effect, quantization error, off-axis error and the effect of sparse sampling. The mathematical form of an exemplary filter function of this type is shown in Equation 3 of FIG. 10.

Figure 9A:
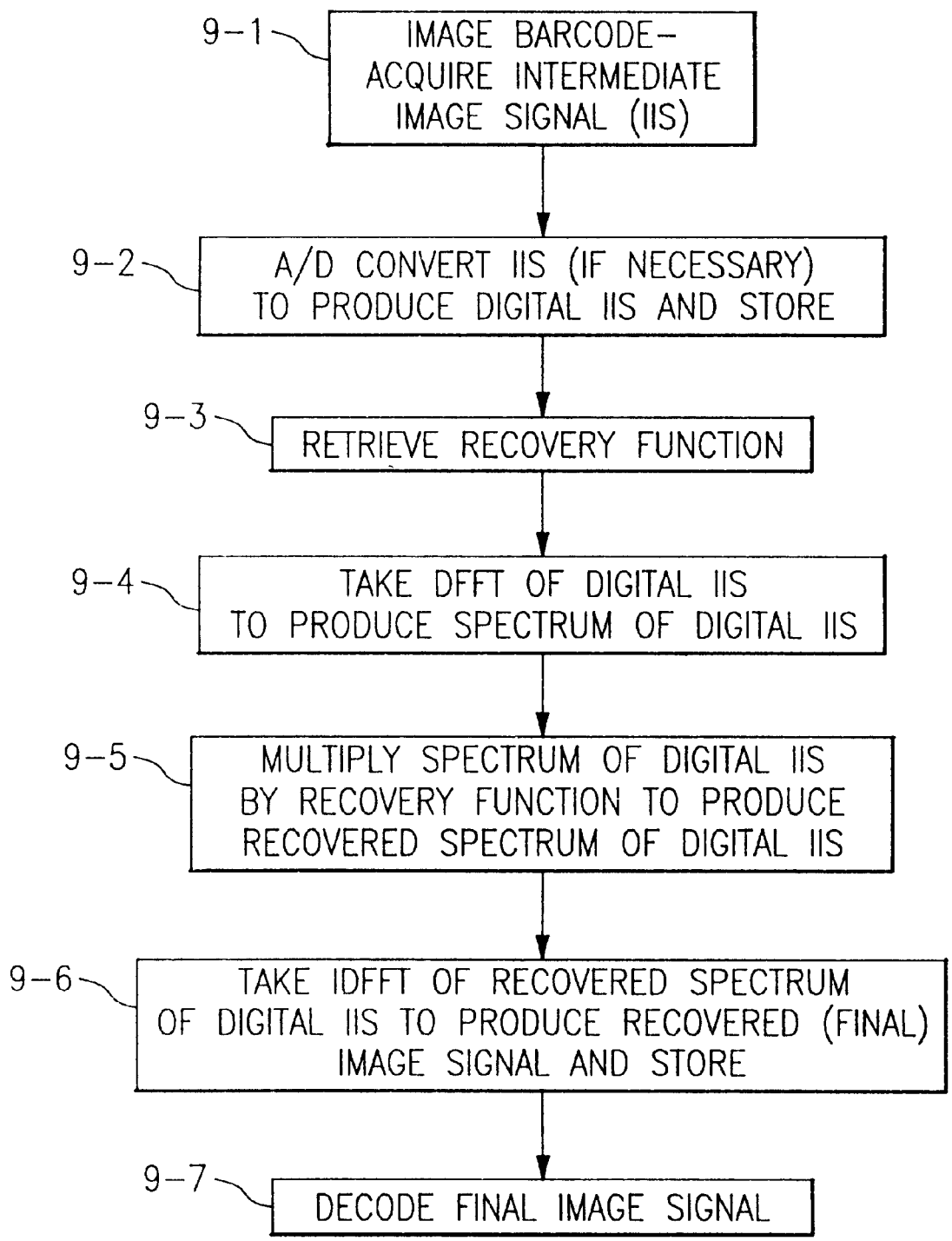
FIG. 9A illustrates the steps used in applying the recovery function of the invention in the spatial frequency domain.

Referring to FIG. 9A, there is shown an exemplary embodiment of a method for using the recovery function of the invention, in this case a method for using it to read a bar code symbol. In FIG. 9A, the first step 9-1 includes the step of acquiring the image to be read. In the 2D reader of FIG. 6, this step includes the illumination of the target symbol, the formation of an intermediate image having an unknown degree of misfocus on image sensor 30-4, and the conversion of that image into an intermediate image signal (IIS). In step 9-2, this IIS is converted to a digital IIS (if necessary) by A/D converter 34-4 and stored in RAM 46-4, preferably as an array or matrix of gray scale image data values, and thereby made available for post-processing. In the embodiment of FIG. 9A, this post-processing includes the use of the recovery function in the spatial frequency domain and the use of an IDFFT to return the results to the spatial domain for final bar code decoding. This post-processing may also be performed in the spatial domain, as explained later in connection with the embodiment of FIG. 9B.

In step 9-3 of FIG. 9A, the recovery function, preferably with a filtering function appropriate for the application, is retrieved from ROM 44-4, where it is stored at the time of manufacture, and made available to the processor which will use it (step 9-3). A DFFT is then performed on the stored digital IIS (step 9-4) and the resulting spectrum of the digital IIS, which takes the form of an array or matrix of complex numbers, is multiplied by the recovery function (step 9-5), on an element by element basis, to produce a recovered spectrum of the digital IIS. In accordance with the invention, the latter spectrum comprises a spatial frequency domain representation of the read image which is compensated for the unknown degree of misfocus and other sources of error that were taken into account in the recovery function . Once this recovered spectrum is available, an IDFFT is performed thereon to produce a recovered or final image signal (step 9-6). Once this recovered image signal is stored in memory, it is ready for decoding in a manner known to those skilled in the art (step 9-7).

Figure 9B:
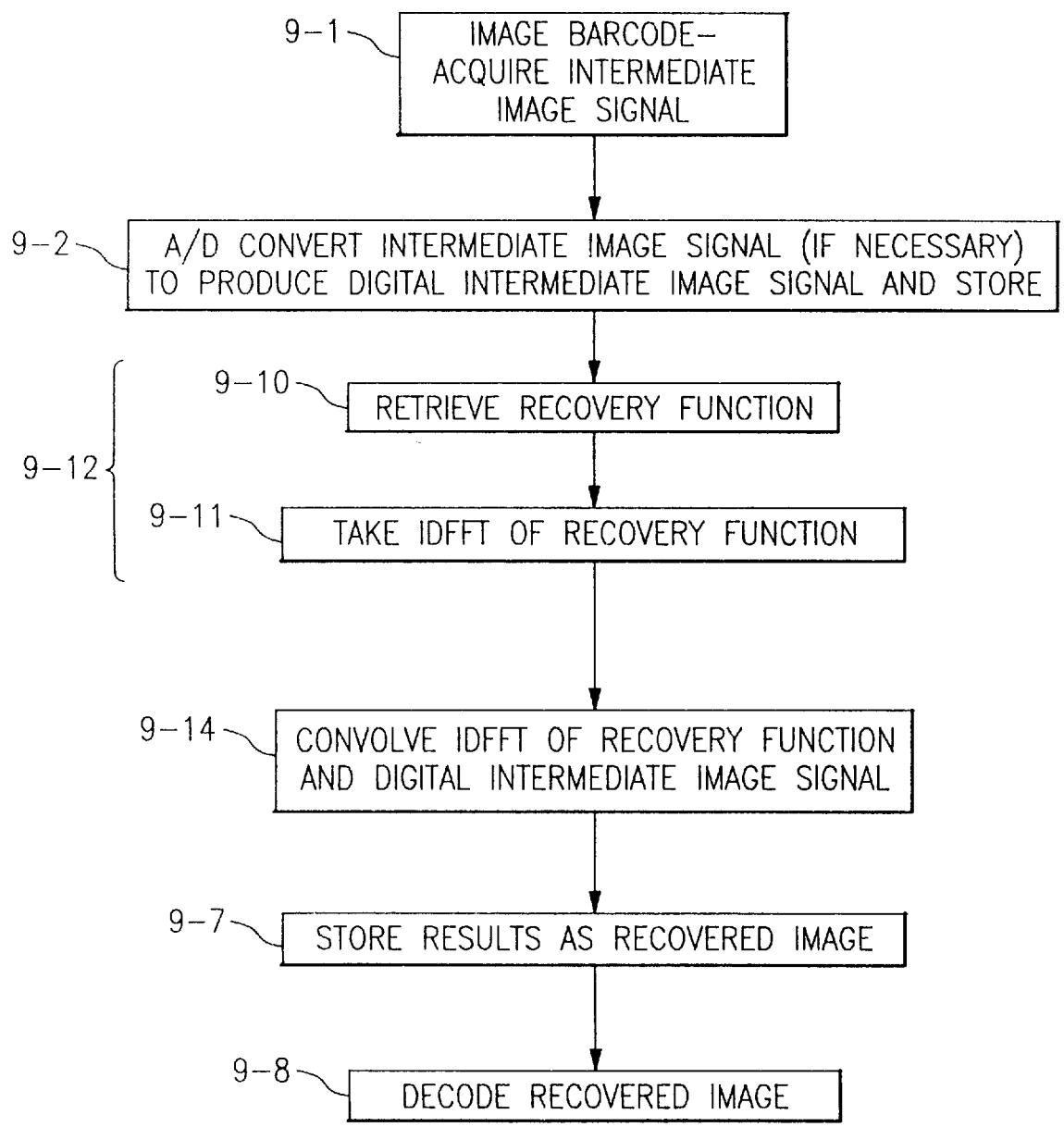
FIG. 9B illustrates the steps used in applying the recovery function of the invention in the spatial domain.

FIG. 9B illustrates how the method and apparatus of the invention may be practiced in the spatial domain. The first two steps, 9-1 and 9-2, the acquisition, conversion and storage of an intermediate image are the same as those discussed in connection with FIG. 9A. The next two steps, 9-10 and 9-11, may include the accessing of the recovery function of the invention, as defined in FIG. 8, and the taking of the IDFFT thereof to produce a spatial domain representation of that recovery function. Alternatively, if the IDFFT is generated and stored in the reader at the time of manufacture, the latter steps may be combined into a single step 9-12, which includes the retrieval of the spatial domain representation of the recovery function.

Once the spatial domain representations of the digital IIS and the recovery function are both available, the latter is applied to the former in step 9-14 to produce a spatial domain recovered image signal by convolving the recovery function with the digital IIS. If the optical system is not shift or spatially invariant, the convolution integral should not be used, and the more general superposition integral be used instead. Since both of these integrals are well known to those skilled in the art, the particulars of the application thereof are not discussed in detail herein. Similar conditions are understood to apply to the spatial frequency domain representation of the digital IIS, i.e., the spectrum of the digital IIS. More particularly, if the optical system is not shift or spatially invariant, then the Fresnel approximation to the Kirchoff or the Rayleigh-Sommerfeld equations (See page 51, equation 3-48 of the earlier mentioned Goodman reference) which permits the use of the Fourier transform method is probably not valid, and full diffraction theory must be used instead.

The recovery methods illustrated in FIGS. 9A and 9B are understood to be substantially equivalent to one another. This is because multiplication in the spatial frequency domain is the equivalent of convolution in the spatial domain via the convolution theorem for Fourier transforms. This equivalence does not, however, mean that the use of the methods of FIGS. 9A and 9B are equally easy to use, or that the DSPs which apply them use similar amounts of memory or operate with equal speed. In practice, the recovery function is usually more easily and quickly applied in the spatial frequency domain. Accordingly, the embodiment of FIG. 9A is regarded as the preferred embodiment of the method and apparatus of the invention.

Figure 11:
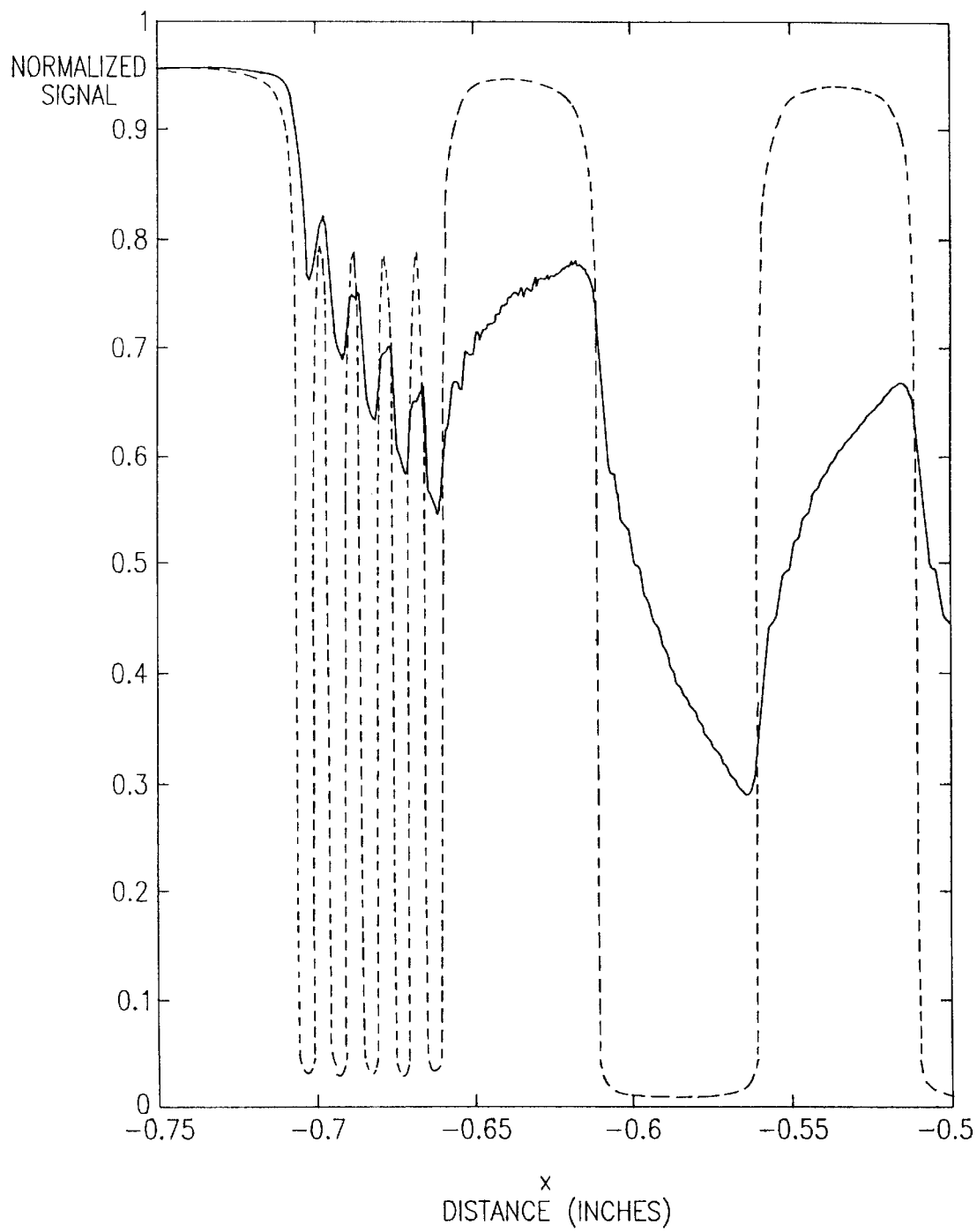
FIG. 11 shows the calculated intermediate image signal which are produced when the 1D imaging system of the invention is used with the recovery function, but without the amplitude mask of the invention.
Figure 12:
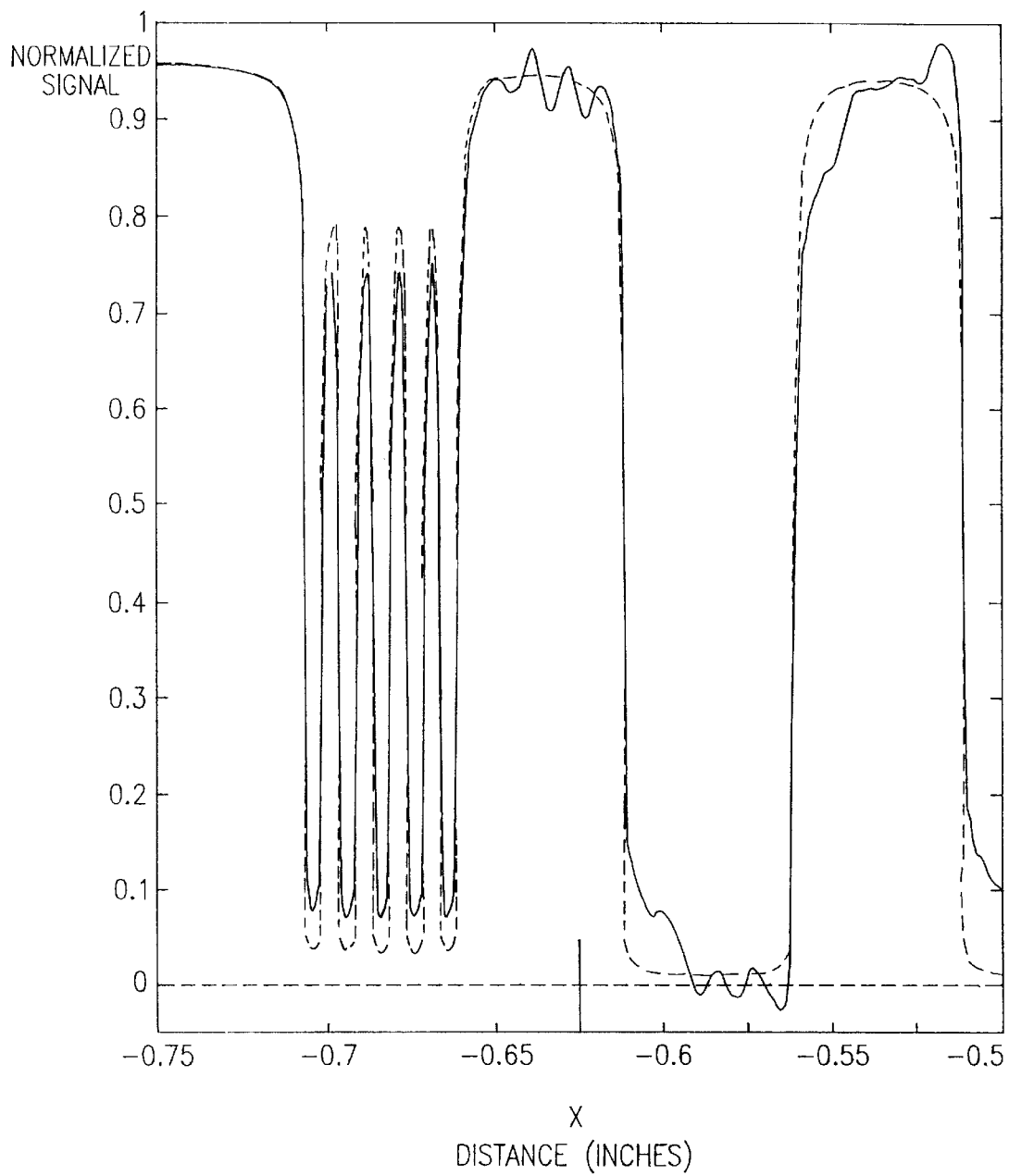
FIG. 12 shows the calculated final image signal which are produced when the 1D imaging system of the invention is used with the recovery function, but without the amplitude mask of the invention, as obtained from the intermediate signal of FIG. 11.
Figure 13:
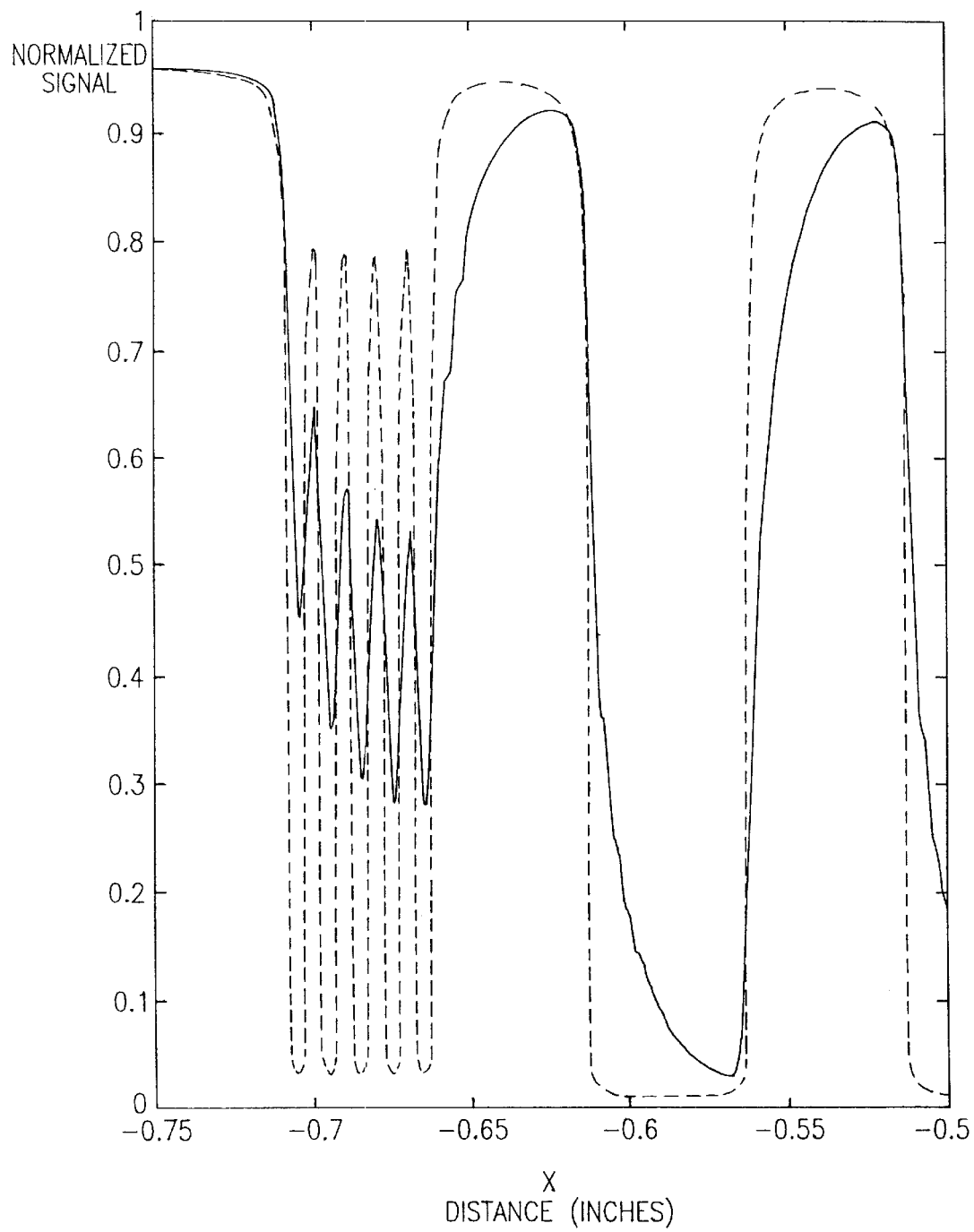
FIG. 13 shows how the intermediate image signals of FIG. 11 is changed by the addition of an amplitude mask.
Figure 14:
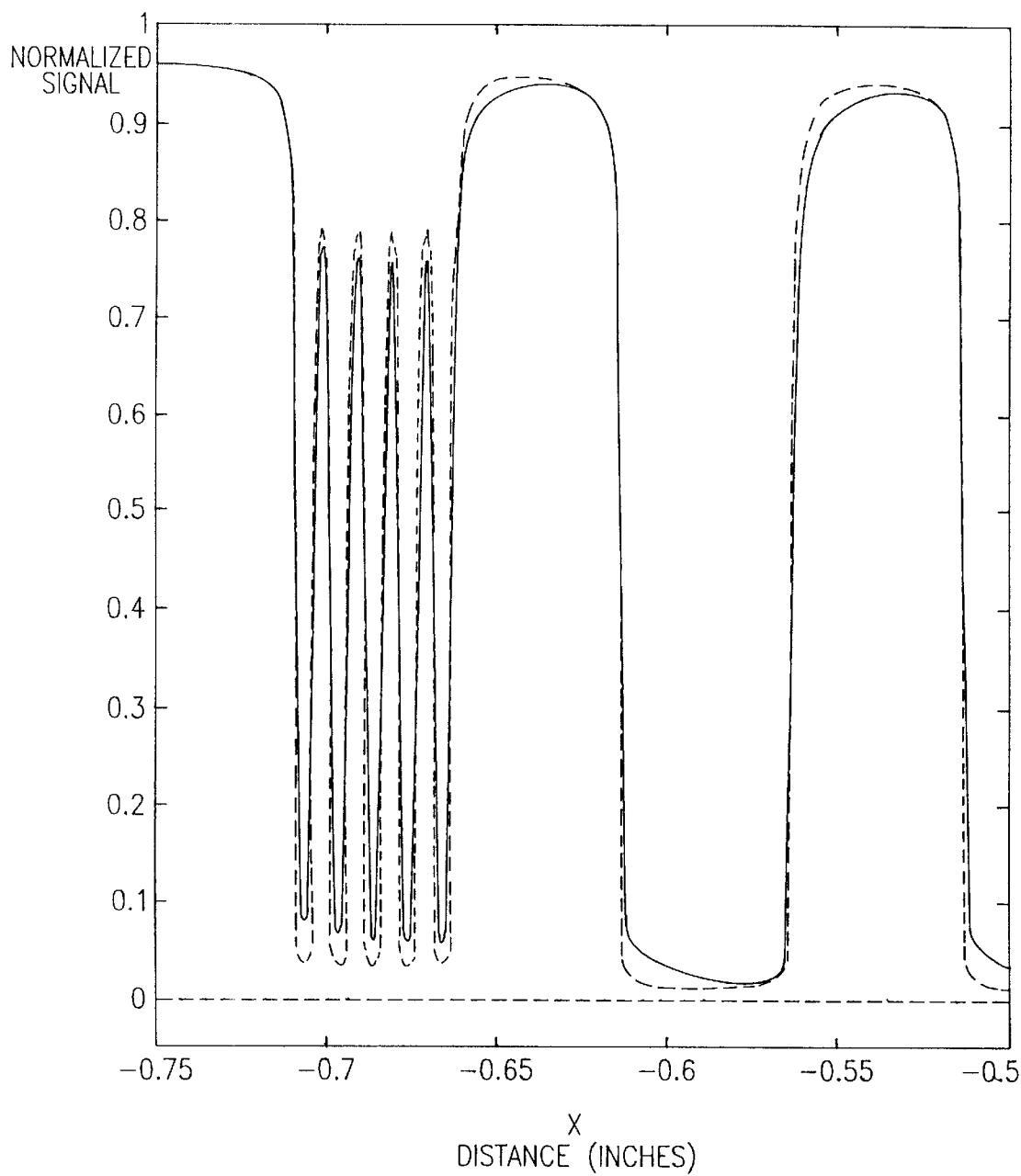
FIG. 14 shows how the final image signals of FIG. 12 is changed by the addition of an amplitude mask.

The magnitude of the improvement in image quality that is produced by the method and apparatus of the invention is illustrated in FIGS. 11–14, each of which shows in dotted lines the calculated reflectivity, as a function of distance X, for an exemplary object which takes the form of a bar code test pattern, together with the corresponding calculated normalized magnitude of the intermediate or final image signal, with and without the amplitude mask of the invention. FIG. 11, for example, shows the reflectivity of the bar code test pattern together with the intermediate image signal that is produced when an imaging system of the type shown in FIG. 6 uses the recovery function but not the amplitude mask of the invention. FIG. 12 shows the same test pattern together with the final signal recovered from the intermediate image signal of FIG. 11. Together, these figures show that even without an amplitude mask, the recovery function of the invention results in a final image signal which resembles the reflectivity of the test pattern from which it was derived. FIG. 13 shows the calculated intermediate image signal that is produced when an imaging system of the type shown in FIG. 6 uses both the recovery function and the amplitude mask of the invention, and FIG. 14 shows the calculated associated final image signal. Together, these figures show that when the recovery function and amplitude mask of the invention are used in conjunction with one another, they cooperate and complement one another to produce a final image which represents a substantial improvement over previously known imaging systems that use phase masks and phase mask-based approximations of recovery functions.

While the above-described embodiments make use of the discrete Fourier transform pair and transform quantities back and forth between the spatial and spatial frequency domains, the present invention may be practiced using other types of transform pairs, or other types of convolution or superposition integrals, together with the corresponding types of domains. The recovery function and recovery algorithm of the invention might, for example, be implemented using wavelet transform pairs and transformations back and forth between the spatial frequency and spatial domains. It will therefore be understood that the present invention is not limited to any particular type of transform pair, or equivalent convolution or superposition integral, and any particular types of transform domains.

New material of present application.

Figure 15:
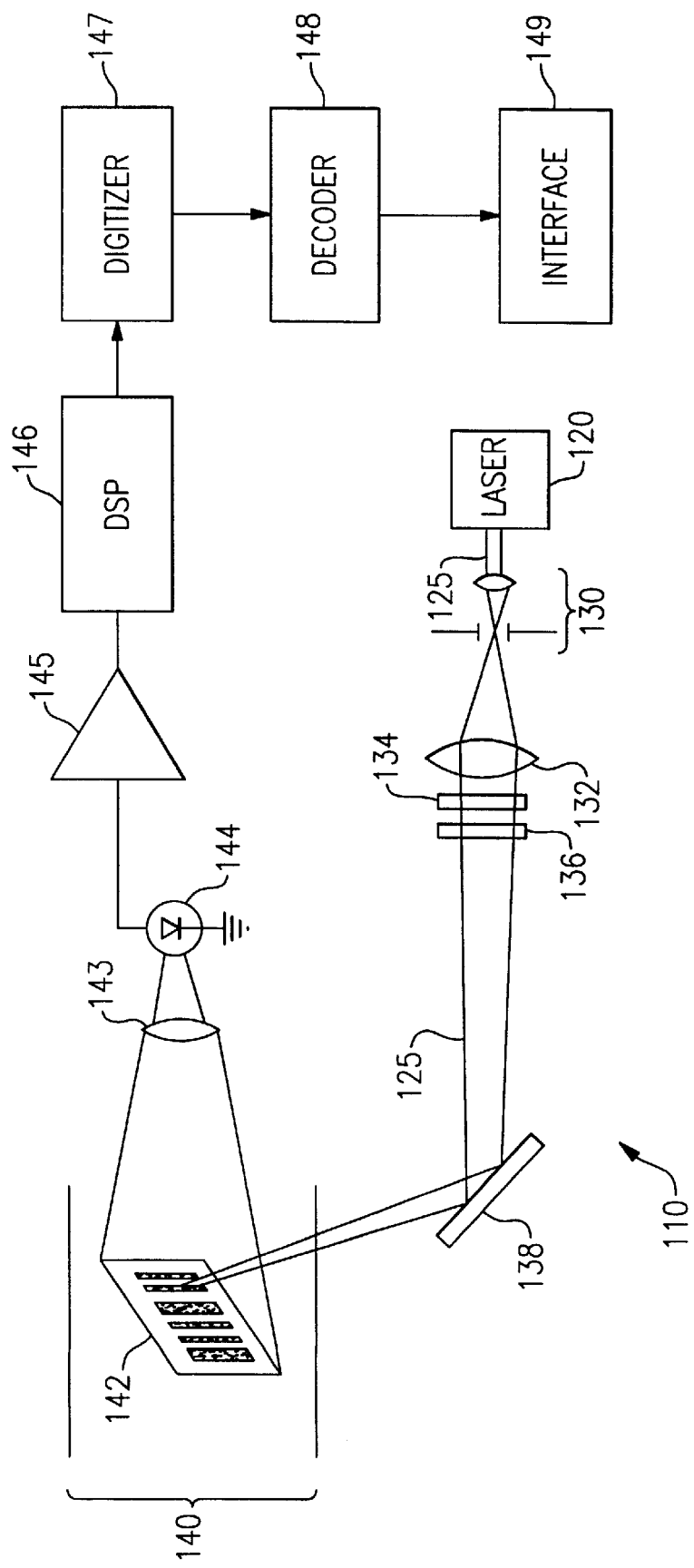
FIG. 15 shows a bar code laser scanning system according to an embodiment of the present invention.

Referring to FIG. 15, a bar code laser scanner system 110 includes a laser 120 such as a gas laser or a solid state laser. An LED, superluminescent diode, or indeed any sufficiently small sufficiently monochromatic illumination source, can be used. A broadband source with a filter to provide essentially monochromatic light can also be used as can a pinhole or small aperture in front of an extended light source. A light beam 125 from laser 120 passes through a spatial filter 130 and a condenser lens 132. Beam 125 then passes through a cubic phase mask (CPM) 134 and an optional amplitude mask 136. CPM 134 is preferably of a type shown in FIGS. 3A, 3B, 3D, 5A, and 5B. Beam 125 is then reflected off a rotating or vibrating mirror 138 into an operating depth of field (DOF) 140 which contains indicia 142 such as a bar code symbol. Unlike the prior art, the illumination at the plane of indicia 142 is a complex light intensity distribution rather than a single spot. The resulting light intensity distribution, while scaling in size with the distance from lens 132, remains otherwise relatively invariant over the operating DOF 140 for system 110.

A photodetector 144 viewing the operating DOF 140 through an optional optical system 143 receives light from the scanned indicia 142 that represents the convolution of the scanning light intensity distribution with the indicia reflectivity pattern and produces an intermediate image signal which is sent via a buffer 145 to a signal processor such as DSP 146 which reconstitutes the image using digital signal processing. The output of DSP 146 is converted to a bit serial representation of the indicia pattern in a digitizer 147, which is then decoded with a decoder 148 and made available to a user via an interface 149. If DSP 146 outputs a digital signal instead of an analog signal, digitizer 147 is not needed.

Unlike the embodiments described with respect to FIGS. 1–14, we now have localized illumination with flood receive. The localized illumination distribution is similar to that shown in FIG. 7B and is scanned across the indicia. The intermediate signal is the output of the photodiode and needs to be processed by the DSP. This is the same intermediate signal as discussed with respect to the embodiments of FIGS. 1–14, but it is created in a totally different way. The signal from photodetector 144 is the one-dimensional intermediate signal of FIGS. 9A–9B (element 9-1). Processing these signals accordance with FIGS. 9A–9B results in the decoded final image signal.

Instead of a scanning mechanism in the optical path between the illumination optics and the target region, the illumination optics can be translated or rotated so that the phase masked beam traverses across the target region. Similarly, the illumination optics can be held stationary and the indicia moved relative to the localized illumination distribution function. Also note that the misfocus error is dependent on the distance between the illumination optics and the target region and is independent of the distance between the target region and the detection optics.

Referring to FIG. 16A, a scanning system using this illumination technique to obtain an enhanced DOF includes an illuminating source 150 which generates a light beam which is transmitted to a phase mask 154 through a lens or set of lenses 152. If the light beam has a desired amplitude distribution, the beam goes directly from phase mask 154 to a scanning mechanism 158; otherwise the beam passes through an amplitude mask 156. Although the phase mask 154, amplitude mask 156, and lens system 152 are shown is a specific order, there may be system configurations for which another arrangement of the same elements may be more optimum. The light beam leaving scanning mechanism 158 illuminates an object 160 and the reflected or scattered light from object 160 passes through lens or lenses 162 to a photodetector 164. There may be alternate configurations that function adequately without lens system 162. The word "reflected" in this specification and claims is used to mean either reflected, as from a specular surface, or scattered, as is the case for all other surfaces. The signal produced by photodetector 164 is processed by a DSP 166 which corrects for the known effects of phase mask 154, thus resulting in an enhanced depth of field. This mechanism may also be configured so that the return path to lens system 162 is also scanned across object 160. In either case, this is the intermediate signal of FIGS. 9A & 9B (element 9-1). The subsequent signal processing is described above in relation to FIGS. 9A–9B. The appropriate recovery function is developed using the optical elements defined for the condenser optics instead of for the receive optics in accordance with the process of FIG. 8.

The amplitude masking function is optionally accomplished by selecting or designing the light source so that it either partially or completely has the desired amplitude distribution, thereby by either completely or partially eliminating the need for a discreet amplitude masking element. For instance, in systems designed referring to FIGS. 3A, 3B, 3D, 5A and 5B, the amplitude masking function is optionally eliminated.

Figure 16B:
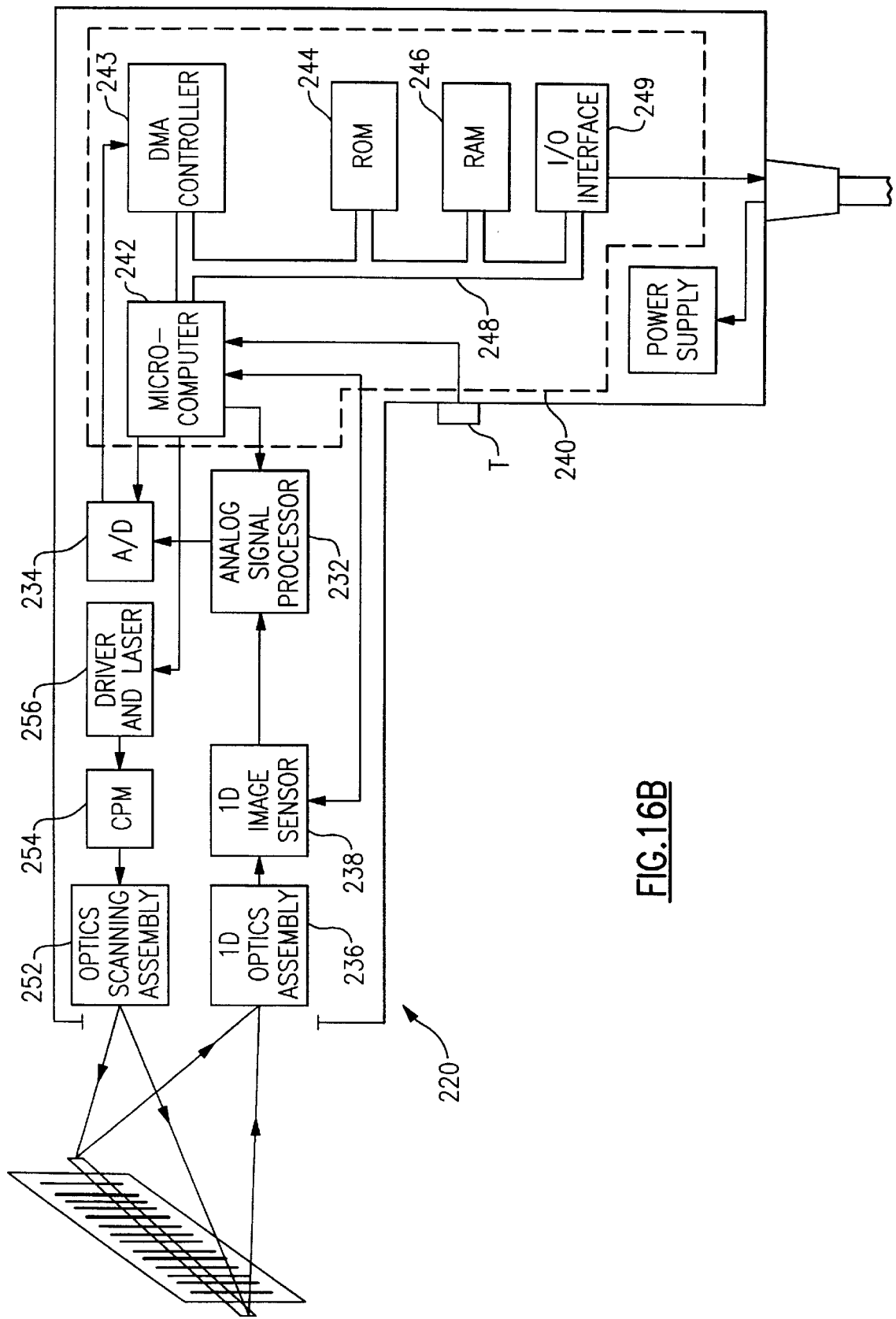
FIG. 16B shows a an opto-electronic block diagram of a 1D optical reader which includes an illumination system of the type shown in FIG. 15 or FIG. 16A.

Referring to FIG. 16B, a detailed embodiment of the system of FIG. 16A is shown, namely, a 1D hand held bar code reader 220. Reader 220 includes an optics assembly 236 and a photosensor 234 for receiving the image. The illumination system portion of reader 220 includes a driver and laser 256, a CPM 254, and an optics scanning assembly 252. An analog signal processing circuit 232 and an analog to digital converter 234 convert the analog output signal of image sensor 234 into an intermediate image signal that can be processed using digital methods in DSP 240. DSP 240 also includes a microcomputer 242, a read only memory (ROM) 244, a read write memory (RAM) 246, and a bus 248 for interconnecting them. A suitable DMA controller 243 may also be included in order to handle the storage of image data, thereby allowing computer 242 to concentrate on the tasks of post-processing the digital intermediate image signal to recover and decode the final image data. The operation of reader 220 is typically initiated either manually, by means of a suitable trigger T, or non-manually by means of an autotrigger arrangement.

The overall operation of reader 220 is controlled by a program stored in ROM 244. Generally speaking, this program includes a reader control portion, a decoding portion, and an image recovery portion. The reader control portion of the program deals with matters such as the starting and stopping of scanning, and the inputting and outputting of data via an I/O interface 249. The decoding portion deals with matters such as identifying the symbology used in the symbol being read and the decoding of that symbol in accordance with the rules that govern that symbology. Because programs for performing these functions are included in commercially available readers, such as the model numbers ST 3400 and IT 4400 readers sold by the assignee of the present invention, they are not discussed in detail herein. The image recovery portion of the program is as discussed earlier in connection with FIGS. 9A and 9B.

Referring to FIG. 17, a specific example of a 1-D laser scanning optical assembly that includes an amplitude mask and a phase mask that is suitable for practicing an embodiment of the present invention is shown. The components are shown in Table 2. This system utilizes two 2-D CPM elements placed back to back so as to create a 1-D CPM. The Gaussian coefficient σ is that distance from the center at which the relative optical transmission is reduced to 1/e time its center value. A simple scanning wheel is used to achieve the scanning motion. The optical elements are assembled in the order shown in FIG. 17.

TABLE 2

| Element designation or description | Dimension | Description |
| --- | --- | --- |
| 420 | Unaphase 1101P | HeNe laser λ = 632.8 nm |
| distance 420 to 425 | approx. 4 inches (not critical) | |
| 425 | f = 4.5 mm | spatial filter objective lens |
| distance 425 to 426 | <5 mm as adjusted properly | |
| 426 | D = 10 microns | spatial filter pinhole diameter |
| distance 426 to 436-1 | 393.5 mm | |
| 436-1 | 0.813 mm glass holder | index n = 1.51509 |
| 436-2 | 0.6096 mm acrylic amplitude mask | index n = 1.48978 amplitude mask Gaussian coefficient σ = 0.0876 inch |
| 436-3 | 0.183 mm glass holder | index n = 1.51509 |
| distance 436-3 to 432 | 1.56 mm | |
| 432 | lens 3.1 mm thick BK7 Biconvex | radii of curvature = 206.95 mm |
| distance 432 to 434-1 | 1.62 mm | |
| 434-1 | 1.702 mm thick acrylic CPM | index n = 1.48978 C03 = 0.0787 (1/inch)$^2$ |
| distance 434-1 to 434-2 | 0.10 mm | |
| 434-2 | 1.702 mm thick acrylic CPM | index n = 1.48978 C03 = 0.0787 (1/inch)$^2$ |
| distance 434-2 to bar code test symbol 442 | see appropriate text | |

Figure 18:
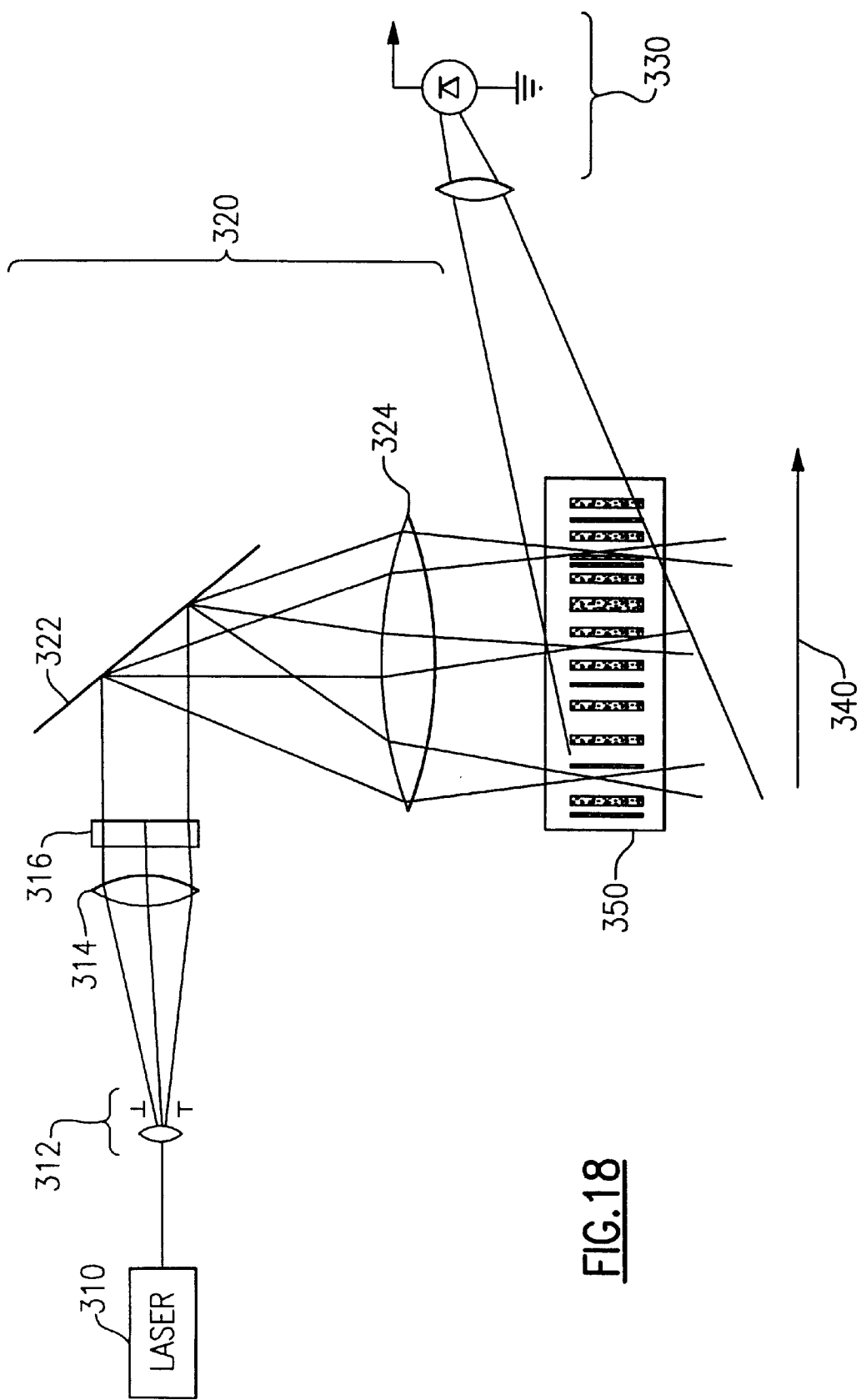
FIG. 18 shows a bar code laser telocentric scanning system according to an embodiment of the present invention.
Figure 20A:
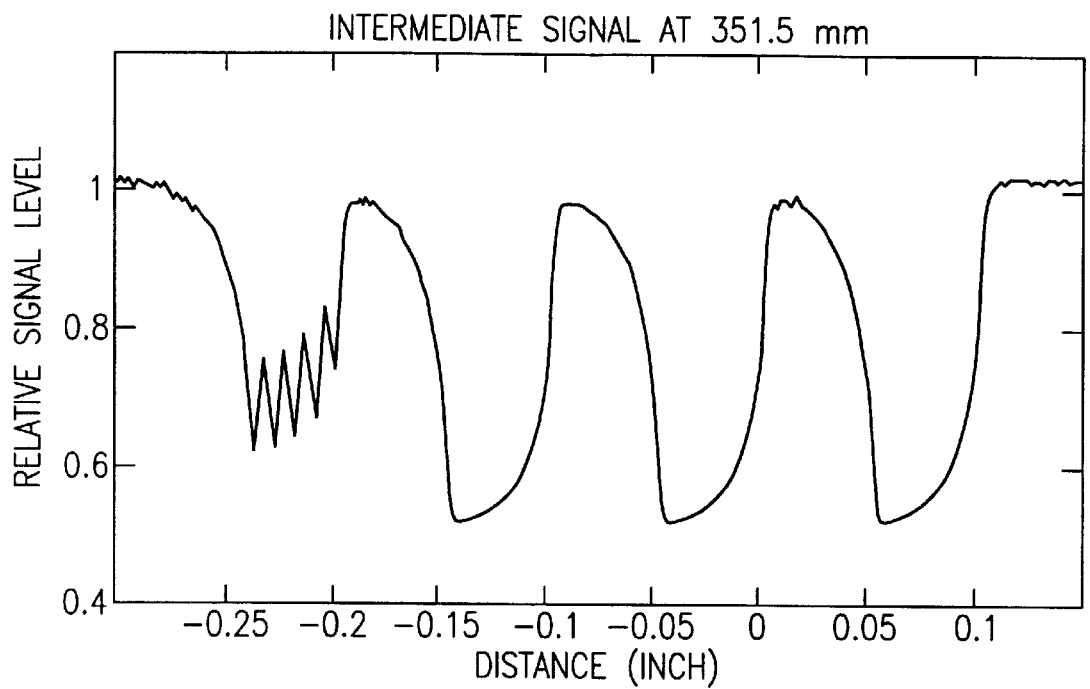
FIG. 20A shows a scan profile of the intermediate signal made with the present invention at a target distance of 351.5 mm.
Figure 20B:
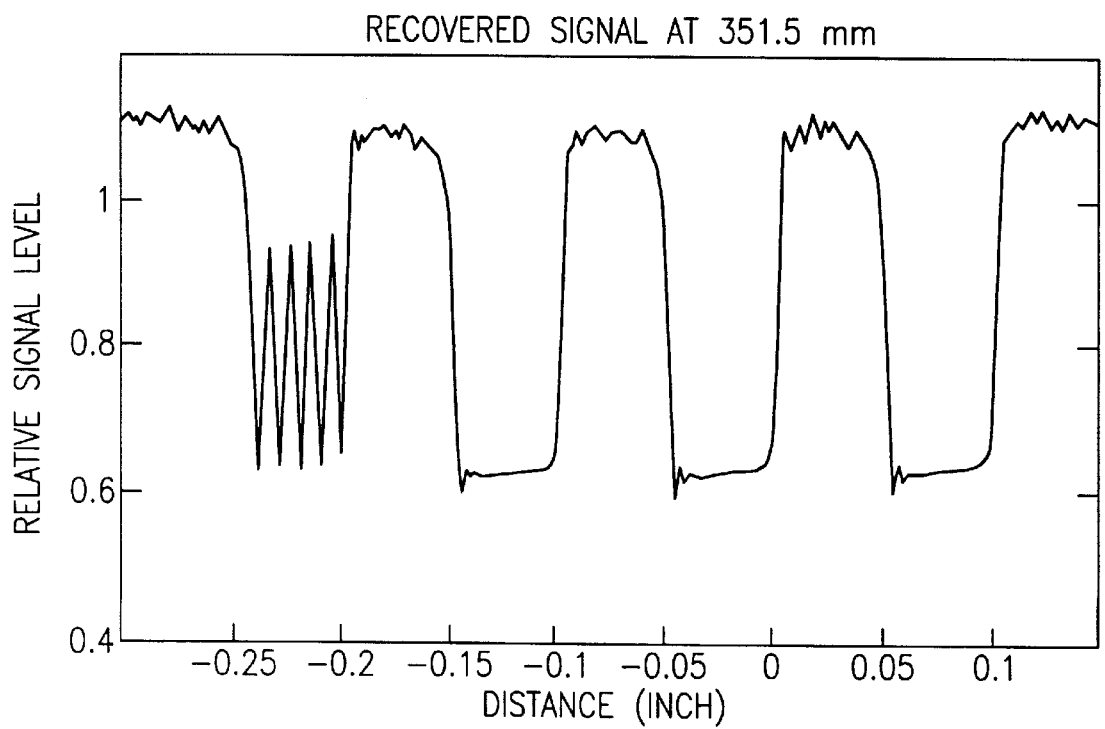
FIG. 20B shows a scan profile of the reconstructed digital signal corresponding to the intermediate signal of FIG. 20A made with the present invention at a target distance of 351.5 mm.
Figure 21A:
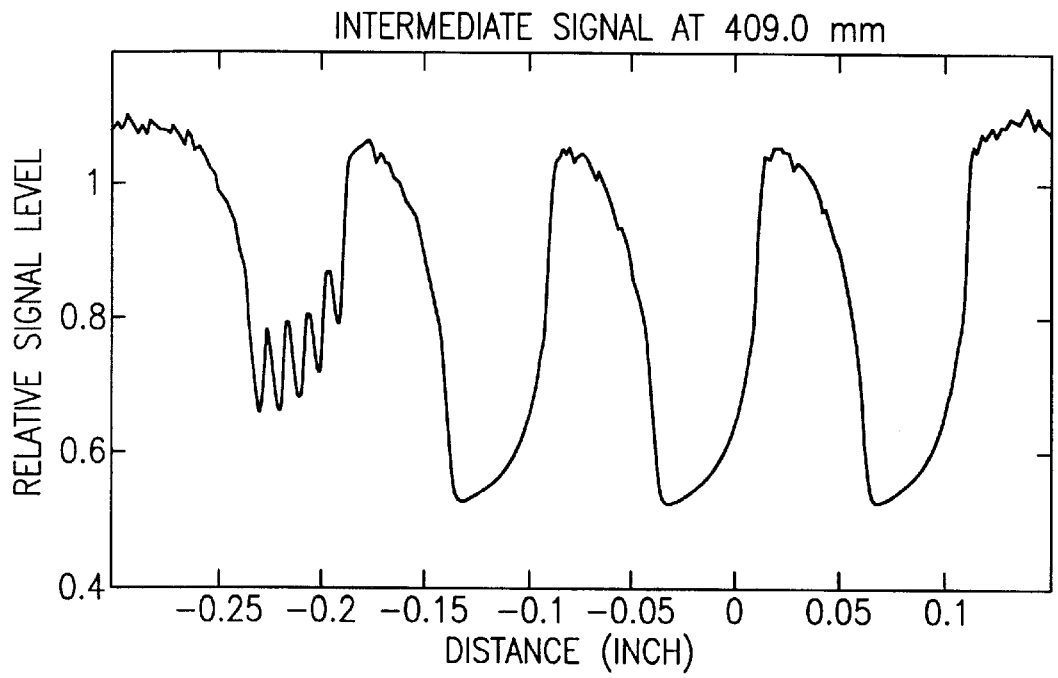
FIG. 21A shows a scan profile of the intermediate signal made with the present invention at a target distance of 409.0 mm.
Figure 21B:
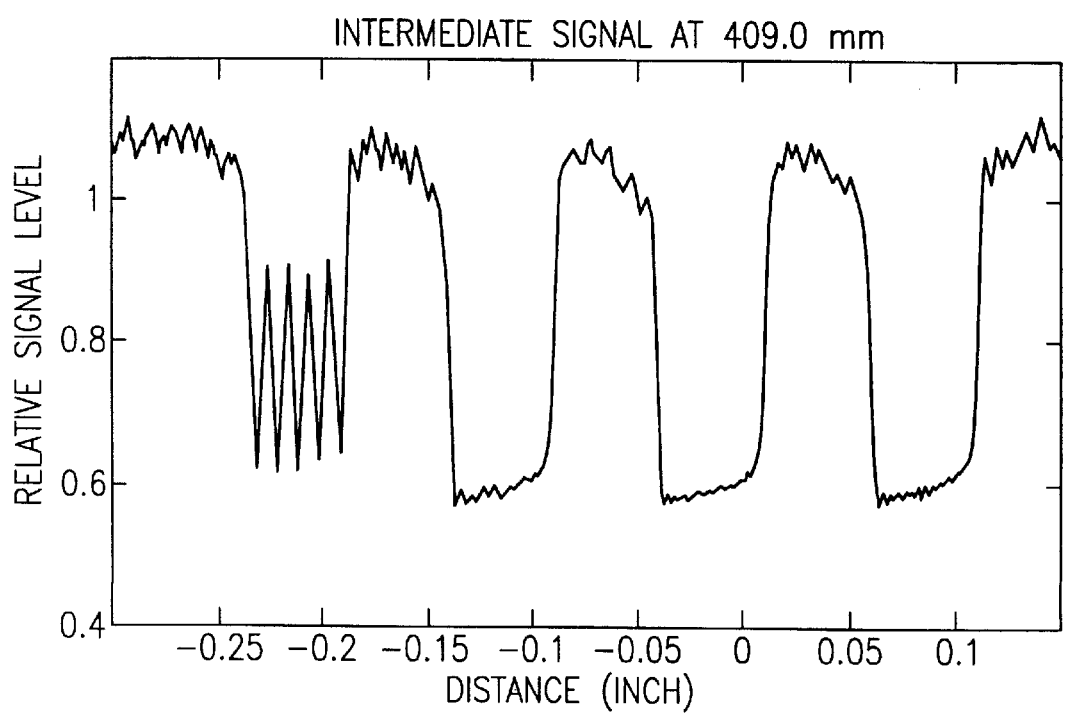
FIG. 21B shows a scan profile of the reconstructed digital signal corresponding to the intermediate signal of FIG. 21A made with the present invention at a target distance of 409.0 mm.
Figure 22A:
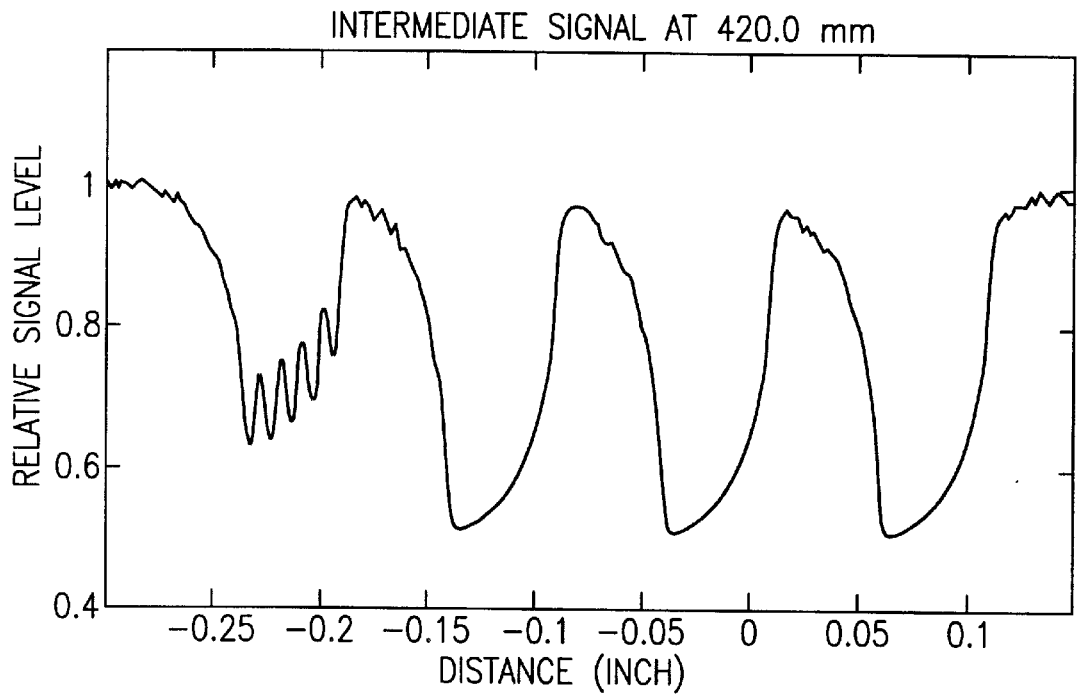
FIG. 22A shows a scan profile of the intermediate signal made with the present invention at a target distance of 420.0 mm.
Figure 22B:
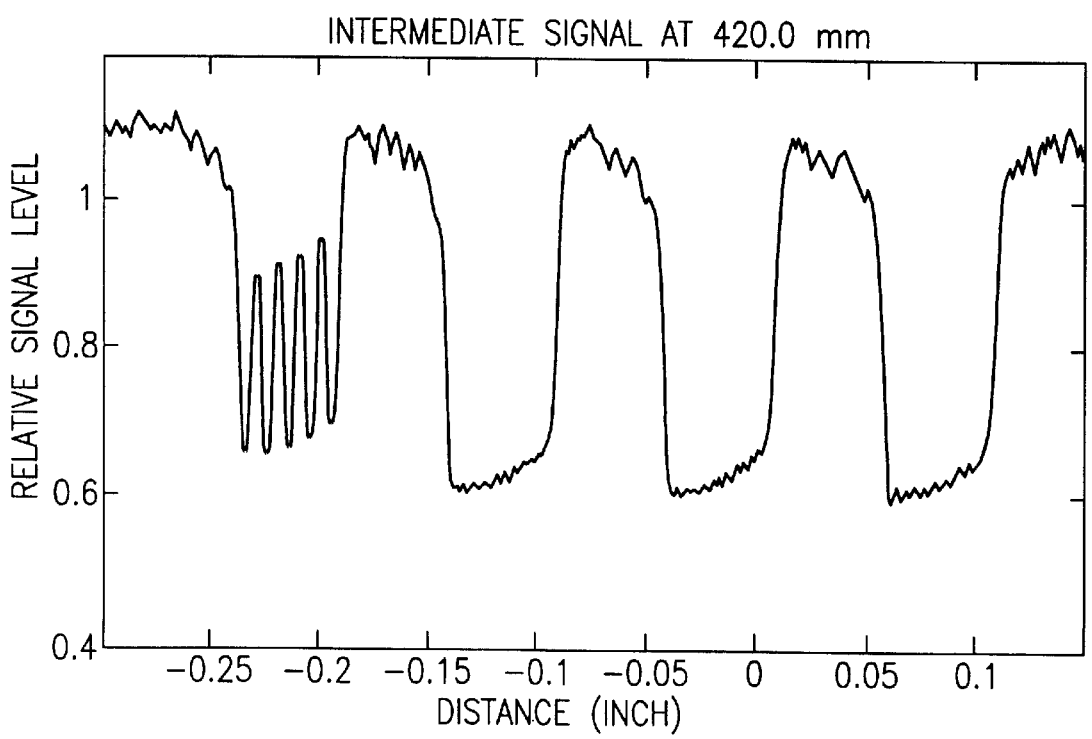
FIG. 22B shows a scan profile of the reconstructed digital signal corresponding to the intermediate signal of FIG. 22A made with the present invention at a target distance of 420.0 mm.
Figure 23A:
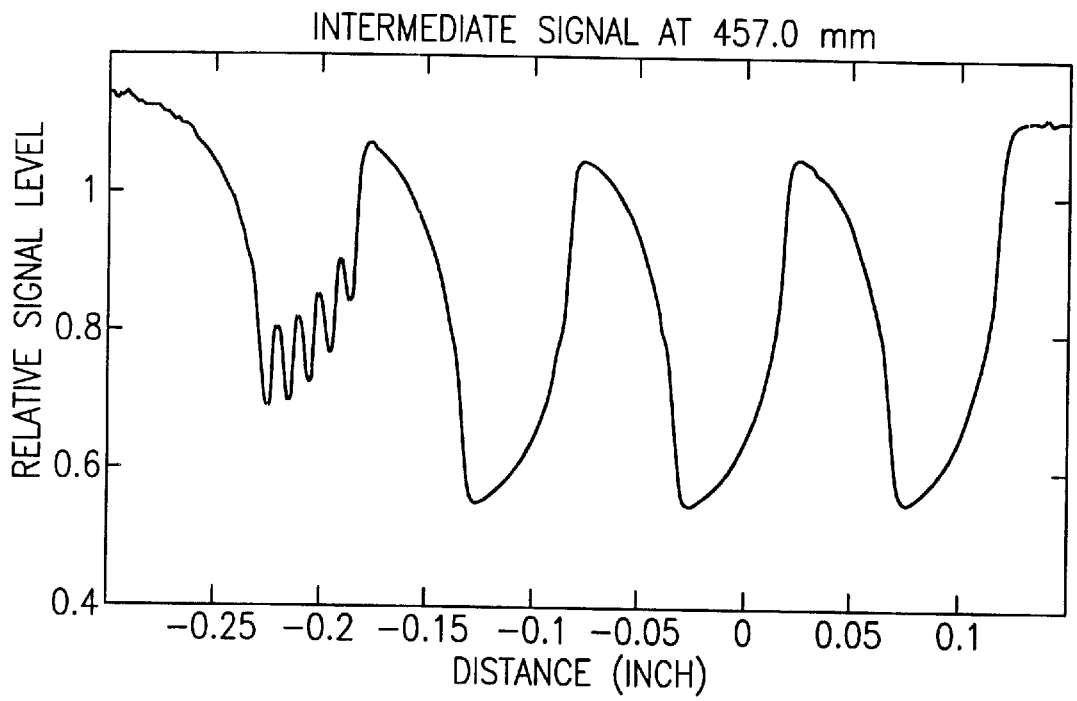
FIG. 23A shows a scan profile of the intermediate signal made with the present invention at a target distance of 457.0 mm.
Figure 23B:
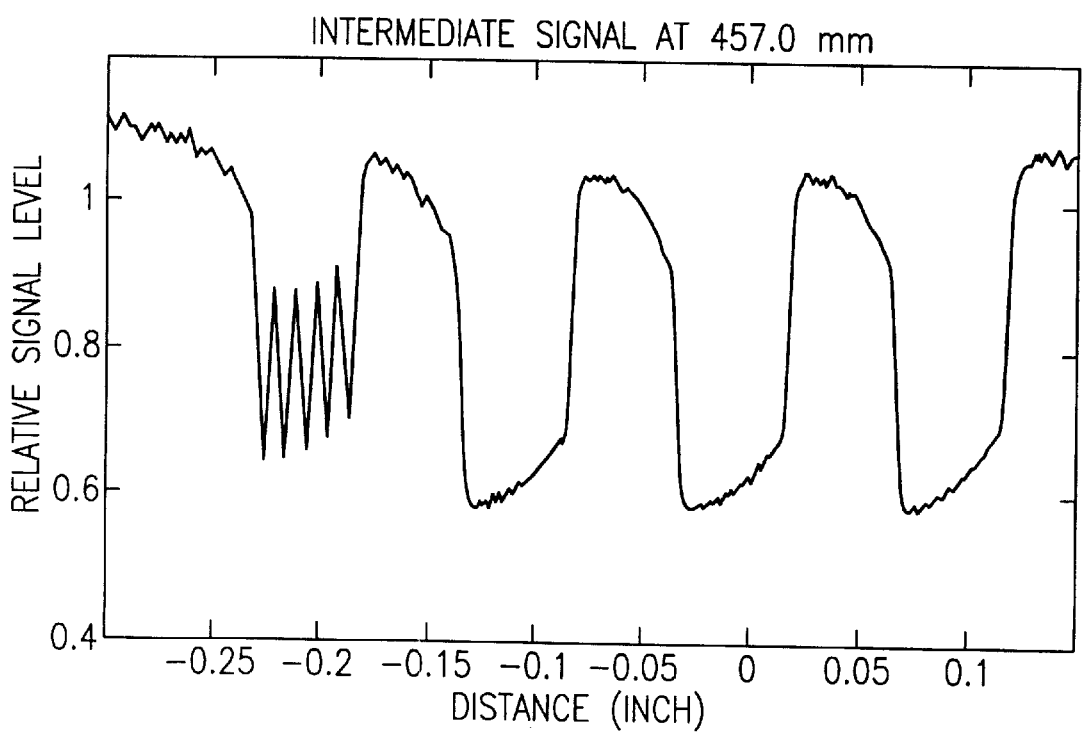
FIG. 23B shows a scan profile of the reconstructed digital signal corresponding to the intermediate signal of FIG. 20A made with the present invention at a target distance of 457.0 mm.

Referring to FIG. 18, another embodiment uses a telocentric scanning process so that the scale of the intermediate image does not change over space. A laser 310 sends a beam of light through a spatial filter 312 to a collimating lens 314. The collimated beam then passes through a CPM 316, at which point it is still almost collimated. The beam then enters a telocentric scanner 320 which includes a scanning mirror 322 and a lens or lenses 324. The scanned masked beam is reflected from an object 350 and received by a detector 330. Detector 330 outputs a signal which is processed as previously described to recover the image. The apparent scanning motion is shown by an arrow 340. The scan rate, in inches per second, in the paper plane is essentially independent of the bar code location.

One can also use an array of lasers as opposed to a scanning laser. The array is electrically scanned, with the individual lasers or LED's being activated in a precise order. For example, see U.S. Pat. No. 5,258,605 showing an electronically scanned array of light sources rather than a single light source. If a 2-D image is being reconstructed, then a 2-D phase mask and optional amplitude mask are required. The localized illumination distribution function is similar to that shown in FIG. 7D. A 2-D recovery function is used to recover the final image. Otherwise, the 2-D system is essentially the same as the 1-D system.

Referring to FIGS. 19A–19D, a series of scan profiles are presented made with a conventional laser scanner constructed with the optical system described in Table 2 in which the cubic phase mask is removed. Note that for all of these figures the amplifier is configured so that an increase in signal level results in a signal displacement in a downward direction. The bar code test object consists of 5 narrow bars and 4 narrow spaces having widths of 0.0049 inch followed by 3 large spaces and 3 large bars having widths of 0.050 inch. The figures show traces taken with only a lens and Gaussian amplitude mask. The narrow bar pattern appears as the group of four peaks within the first valley. The greater the amplitude of these four peaks, the more readable the pattern is for a digitizer. FIG. 19A is taken at 410.0 mm, FIG. 19B is taken at 402.0 mm, FIG. 19C is taken at 391.0 mm, and FIG. 19D is taken at 378.0 mm. The distance noted is the distance between the lens and the test object. Note that this system has a well defined signal profile over an operating range slightly in excess of 19 mm.

Referring to FIGS. 20A–23B, scan profiles are shown for four different target positions (351.5 mm, 409.0 mm, 420.0 mm, and 457.0 mm, respectively) over an operating range of approximately 106 mm. The intermediate signal is shown in FIGS. 20A, 21A, 22A, and 23A, while the corresponding reconstructed digital images are shown in FIGS. 20B, 21B, 22B, and 23B. Note the significantly improved signal profiles when compared to the same object viewed without the improved optical system.

Figure 24:
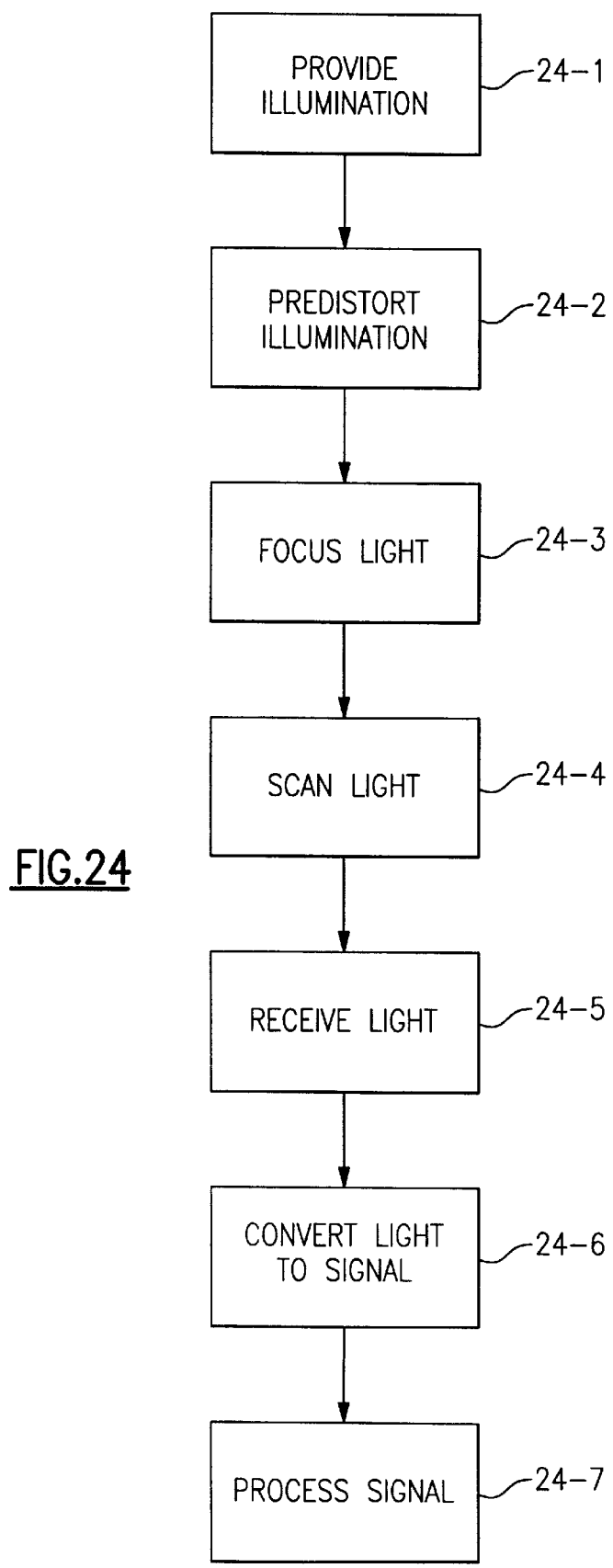
FIG. 24 shows a method of implementing the present invention.

Referring to FIG. 24, a method is outlined implementing the present invention. The intent of this method is to retrieve the information encoded in an indicia, such as a bar code, that is located in a space being scanned by a laser scanner. The bar code is located in a region of space in the field of view of the scanner and more specifically in a region called the depth of field. Typically the depth of field together with the field of view define an operational volume for the scanner. It is the intent that the scanner will be able to retrieve the information contained in the indicia anywhere in this operational volume. Typically the indicia is illuminated with light generated by a laser diode as represented in step 24-1. The illumination is modified or predistorted in a known fashion using a phase mask that changes the phase of the light locally as a function of position in the phase mask. It may also be necessary, in order to optimize the system operation, that the amplitude of the light (i.e. the intensity) by modified with an amplitude mask such that the amplitude changes in a known fashion as a function of position in the amplitude mask. This modification of the phase and amplitude operationally occurs in step 24-2.

Regardless of the physical location of the elements used to modify the phase and amplitude, the light is focused with a lens or lenses such that the light forms a desired light intensity distribution pattern throughout the operational volume as shown in step 24-3. As represented with step 24-4, the focused illumination is caused to scan across the indicia by having the light intensity distribution pattern move relative to the indicia. Light scattered from the indicia is then received by a photodetector in step 24-5. This may include the use of a lens or lenses and/or a mirror or mirrors to increase the optical efficiency of this collection process. The photodetector output, step 24-6, represents the intermediate image signal. This intermediate image signal is processed in accordance with either FIG. 9A or 9B as shown in step 24-7 to retrieve the information that was originally encoded in the indicia.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. An imaging system for imaging an object located in a target region, comprising:
   an illumination source;
   an optical path between said illumination source and said object;
   a first optics assembly in said optical path;
   phase masking means in said optical path for receiving light and modifying a phase thereof as a function of position within said phase masking means, thereby creating phase modified light having known effects therein;
   means for traversing said phase modified light across said object in said target region;
   image sensing means for receiving light reflected from said object and producing an intermediate image signal therefrom;
   said intermediate image signal including at least a misfocus error that is dependent upon a distance between said first optics assembly and said object; and
   processing means for correcting for said known effects of said phase modified light to produce a final image signal of said object.

2. An imaging system according to claim 1, wherein said means for traversing includes a scanning mechanism.

3. An imaging system according to claim 1, wherein said phase masking means is between said illumination source and said first optics assembly.

4. An imaging system according to claim 1, wherein said phase masking means is between said first optics assembly and said target region.

5. An imaging system according to claim 1, further including amplitude masking means, in said optical path between said phase masking means and said object, for varying an attenuated amplitude as a function of position within said amplitude masking means, said function being substantially free of discontinuities.

6. An imaging system according to claim 5, wherein at least two of said amplitude masking means, said first optics assembly, and said phase masking means comprise different parts of a single element.

7. An imaging system according to claim 1, further including a second optics assembly in a second optical path between said object and said image sensing means.

8. An imaging system according to claim 1, wherein said illumination source is a laser light source.

9. An imaging system according to claim 8, wherein said means for traversing is a telocentric scanning mechanism.

10. An imaging system according to claim 8, wherein said phase masking means is a cubic phase mask which is shaped so that it corrects approximately for said misfocus error.

11. An imaging system according to claim 8, wherein said phase masking means includes at least one phase mask for receiving light incident thereon and modifying a phase thereof to cause an Optical Transfer Function (OTF) of said first optics assembly to be approximately invariant over a predetermined depth of field.

12. An imaging system according to claim 8, wherein said processing means includes a digital signal processor.

13. An imaging system according to claim 8 in which said processing means is adapted to calculate a transform and inverse transform of signals generated during operation of said imaging system, and in which said transform and inverse transform include at least a discrete fast Fourier transform and an inverse discrete Fast Fourier transform.

14. An imaging system according to claim 8, wherein said processing means includes a generalized recovery function including a finishing function which is adapted to optimize performance of said imaging system for bar code reading applications.

15. An imaging system according to claim 14, wherein said image sensing means is a photodetector, and in which said generalized recovery function is a generalized 1 D recovery function.

16. An imaging system according to claim 14, wherein said image sensing means is a photodetector, and in which said generalized recovery function is a generalized 2D recovery function.

17. An imaging system according to claim 14, wherein said generalized recovery function further includes a finishing function which takes into account at least one of (a) an effect of non-uniform illumination across said target region, (b) aliasing effects, and (c) diffusion effects.

18. An imaging system according to claim 1, wherein said illumination source is a light emitting diode.

19. An imaging system according to claim 18, further comprising amplitude masking means for receiving light from said phase masking means and transmitting light to said means for traversing, said amplitude masking means having an attenuated amplitude that varies as a function of position within said amplitude masking means, said function being substantially free of discontinuities.

20. An imaging system according to claim 19, wherein at least two of said amplitude masking means, said first optics assembly, and said phase masking means comprise different parts of a single element.

21. An imaging system according to claim 19, wherein said scanning mechanism is a telocentric scanning mechanism.

22. An imaging system according to claim 19, wherein said phase masking means is a cubic phase mask which is shaped so that it corrects approximately only for said misfocus error.

23. An imaging system according to claim 19, wherein said phase masking means includes at least one phase mask for receiving light incident thereon and modifying a phase thereof to cause an Optical Transfer Function (OTF) of said first optics assembly to be approximately invariant over a predetermined depth of field.

24. An imaging system according to claim 19, wherein said processing means includes a digital signal processor.

25. An imaging system according to claim 19 in which said processing means is adapted to calculate a transform and inverse transform of signals generated during operation of said imaging system, and in which said transform and inverse transform include at least a discrete fast Fourier transform and an inverse discrete Fast Fourier transform.

26. An imaging system according to claim 19, wherein said processing means includes a generalized recovery function including a finishing function which is adapted to optimize performance of said imaging system for bar code reading applications.

27. An imaging system according to claim 26, wherein said image sensing means is a photodetector, and in which said generalized recovery function is a generalized 1D recovery function.

28. An imaging system according to claim 26, wherein said image sensing means is a photodetector, and in which said generalized recovery function is a generalized 2D recovery function.

29. An imaging system according to claim 26, wherein said generalized recovery function further includes a finishing function which takes into account at least one of (a) an effect of non-uniform illumination across said target region, (b) aliasing effects, and (c) diffusion effects.

30. An imaging system for imaging an object located in a target region, comprising:

a laser illumination source;

a first optical path between said laser illumination source and said object;

a first optics assembly in said first optical path;

a cubic phase mask in said first optical path between said first optics assembly and said object within 0.5 inches of said first optics assembly for receiving light and modifying a phase thereof as a function of position within said cubic phase mask, thereby creating phase modified light having known effects therein;

an amplitude mask in said first optical path;

means for moving said phase modified light across said object;

a photodetector for receiving light reflected from said object and producing an intermediate image signal therefrom;

said intermediate image signal including at least a misfocus error that is dependent upon a distance between said first optics assembly and said object;

a second optics assembly in a second optical path between said object and said photodetector; and processing means for correcting for said known effects of said phase modified light to produce a final image signal of said object.

31. A method of scanning for a laser scanning system suited for reading indicia located in a target region, comprising steps of:

generating an illumination beam for illuminating an indicia located in an operational depth of field;

changing locally a phase of said illumination beam as a function of position before said beam illuminates said indicia;

changing locally an amplitude of said illumination beam as a function of position before said beam illuminates said indicia;

receiving light reflected from said indicia;

converting the received light to an intermediate image signal; and processing said intermediate image signal such that said operational depth of field is extended.

32. A method of modifying a laser beam to maximize the system resolving ability as a bar code indicia is moved throughout an operational depth of field, comprising steps of:

generating a laser illumination beam;

modifying a phase of said illumination beam a function of position in said beam;

modifying an amplitude of said illumination beam as a function of position in said beam;

scanning said phase and amplitude-modified beam across said bar code indicia;

receiving light reflected from said bar code indicia;

converting the received light to an intermediate image signal; and processing said intermediate image signal using a precalculated recovery function to reduce effects of a position of said bar code indicia.

33. A method of scanning a barcode indicia, said indicia containing information encoded therein, comprising steps of:

illuminating said indicia in an operating range with light;

modifying an amplitude and phase of said light to reduce variations in a localized illumination distribution of said light over said operating range before said light illuminates said indicia;

directing said light to said operating range;

scanning said light across said indicia;

receiving light scattered from said indicia;

converting said scattered light to an intermediate image signal; and processing said intermediate image signal to recover said information encoded in said indicia.

34. A method of increasing an operating depth of field, comprising:

providing illumination;

distorting a phase of said illumination in a predetermined manner at a specific distance from an object;

directing said distorted illumination to said object;

receiving light scattered from said object;

converting said received light to an intermediate image signal; and processing said intermediate image signal using a precalculated recovery function to reduce effects of said specific distance.

* * * * *